United States Patent
Yamasaki et al.

(10) Patent No.: US 12,441,347 B2
(45) Date of Patent: Oct. 14, 2025

(54) VEHICLE OUTSIDE RISK VISUAL RECOGNITION GUIDING APPARATUS

(71) Applicant: SUBARU CORPORATION, Tokyo (JP)

(72) Inventors: Tatsurou Yamasaki, Tokyo (JP); Junpei Tokizaki, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 252 days.

(21) Appl. No.: 18/344,361

(22) Filed: Jun. 29, 2023

(65) Prior Publication Data

US 2024/0017735 A1    Jan. 18, 2024

(30) Foreign Application Priority Data

Jul. 14, 2022 (JP) .................... 2022-113519

(51) Int. Cl.
*B60W 50/14* (2020.01)
*B60W 40/08* (2012.01)

(52) U.S. Cl.
CPC ............ *B60W 50/14* (2013.01); *B60W 40/08* (2013.01); *B60W 2050/143* (2013.01); *B60W 2050/146* (2013.01); *B60W 2540/225* (2020.02)

(58) Field of Classification Search
CPC .............. B60W 50/14; B60W 40/08; B60W 2050/143; B60W 2050/146; B60W 2540/225
See application file for complete search history.

(56) References Cited

U.S. PATENT DOCUMENTS

| | | | | |
|---|---|---|---|---|
| 7,747,039 | B2 * | 6/2010 | Fujimoto | G06T 7/12 |
| | | | | 348/148 |
| 8,035,493 | B2 * | 10/2011 | Hioki | G02B 27/01 |
| | | | | 340/435 |
| 9,073,484 | B2 * | 7/2015 | Aimura | G08G 1/166 |
| 9,475,420 | B2 * | 10/2016 | Kamiya | B60Q 9/008 |
| 9,505,413 | B2 * | 11/2016 | Laine | G08G 1/166 |
| 9,514,650 | B2 * | 12/2016 | Ng-Thow-Hing | G08G 1/167 |
| 9,922,564 | B2 * | 3/2018 | Bai | B60Q 1/525 |

(Continued)

FOREIGN PATENT DOCUMENTS

| | | |
|---|---|---|
| JP | 2007-065704 A | 3/2007 |
| JP | 2016-197407 A | 11/2016 |
| JP | 2021-174436 A | 11/2021 |

*Primary Examiner* — Curtis J King
(74) *Attorney, Agent, or Firm* — Rimon P.C.

(57) ABSTRACT

A vehicle outside risk visual recognition guiding apparatus includes an output unit, a vehicle inside detection device, and a processor. The processor acquires the sight-line direction of the driver from the detected information acquired from the vehicle inside detection device. The processor calculates sight-line movement amounts based on the acquired sight-line direction of the driver as a reference. The sight-line movement amounts are each an amount by which the sight line is caused to move to visually recognize any one of warning targets that are risks outside the vehicle. The processor determines a warning order related to the risks outside the vehicle at least based on the sight-line movement amounts. The processor causes the output unit to output the warnings that allow the warning targets that are the risks outside the vehicle to be visually recognized in accordance with the determined warning order.

18 Claims, 11 Drawing Sheets

(56) References Cited

U.S. PATENT DOCUMENTS

| | | | |
|---|---|---|---|
| 10,150,414 B2* | 12/2018 | Myers | H04N 7/18 |
| 10,181,241 B2* | 1/2019 | Von Novak | G08B 5/38 |
| 10,215,583 B2* | 2/2019 | Ng-Thow-Hing | G01C 21/3658 |
| 10,321,273 B2* | 6/2019 | Lee | G08G 1/164 |
| 10,573,183 B1* | 2/2020 | Li | G06N 3/08 |
| 10,652,387 B2* | 5/2020 | Tsuji | B60K 35/28 |
| 10,913,392 B2* | 2/2021 | Morimura | B60W 30/095 |
| 11,009,364 B2* | 5/2021 | Bai | G08G 1/0112 |
| 11,161,456 B1* | 11/2021 | Day | B60R 1/26 |
| 11,180,159 B1* | 11/2021 | Post | G08G 1/04 |
| RE48,958 E * | 3/2022 | Strickland | B60Q 1/525 |
| 11,373,534 B2* | 6/2022 | Eigel | G01C 21/3889 |
| 11,427,195 B1* | 8/2022 | Pertsel | B60L 58/12 |
| 11,961,162 B2* | 4/2024 | Shimazu | H04N 23/00 |
| 11,968,352 B2* | 4/2024 | Yasui | H04N 13/324 |
| 12,080,171 B2* | 9/2024 | Inoue | G08G 1/164 |
| 12,087,143 B2* | 9/2024 | Chang | G08G 1/005 |
| 12,106,669 B2* | 10/2024 | Kurehashi | G08G 1/166 |
| 12,190,729 B2* | 1/2025 | Kurehashi | G08G 1/167 |
| 12,236,705 B1* | 2/2025 | Ulutan | G01S 17/89 |
| 12,260,745 B2* | 3/2025 | Guenther | H04W 4/44 |
| 2005/0154505 A1* | 7/2005 | Nakamura | G02B 27/01 701/1 |
| 2006/0217886 A1* | 9/2006 | Fujimoto | G08B 13/19652 701/96 |
| 2009/0128311 A1* | 5/2009 | Nishimura | G06V 40/18 382/103 |
| 2009/0140845 A1* | 6/2009 | Hioki | B60K 35/235 340/425.5 |
| 2013/0060400 A1* | 3/2013 | Hahne | G08G 1/161 701/1 |
| 2014/0002252 A1* | 1/2014 | Fong | G02B 27/00 340/435 |
| 2014/0266656 A1* | 9/2014 | Ng-Thow-Hing | G08G 1/166 340/435 |
| 2014/0362195 A1* | 12/2014 | Ng-Thow-Hing | G06V 40/20 348/51 |
| 2015/0175068 A1* | 6/2015 | Szostak | B60K 35/215 340/435 |
| 2016/0046290 A1* | 2/2016 | Aharony | B60W 10/20 701/41 |
| 2017/0287332 A1* | 10/2017 | Ranninger Hernandez | B60W 30/09 |
| 2018/0086346 A1 | 3/2018 | Fujisawa et al. | |
| 2018/0326999 A1* | 11/2018 | Hershkovitz | G06V 40/20 |
| 2019/0039628 A1* | 2/2019 | Mizuno | G08G 1/165 |
| 2019/0126824 A1* | 5/2019 | Oba | E05F 15/70 |
| 2019/0130757 A1* | 5/2019 | Hori | G06T 7/75 |
| 2019/0213932 A1* | 7/2019 | Yoneyama | H04N 9/3194 |
| 2020/0126423 A1* | 4/2020 | Li | G08G 1/005 |
| 2020/0385012 A1* | 12/2020 | Maruyama | G06V 20/597 |
| 2020/0391752 A1* | 12/2020 | Hagiwara | G06V 10/80 |
| 2020/0398743 A1* | 12/2020 | Huber | B60W 30/0956 |
| 2020/0406747 A1* | 12/2020 | Sakai | B60K 35/285 |
| 2020/0406905 A1* | 12/2020 | Dong | B60W 30/0956 |
| 2020/0409374 A1* | 12/2020 | Dong | G06V 10/758 |
| 2021/0269053 A1* | 9/2021 | Faizan | G08G 1/16 |
| 2022/0032907 A1* | 2/2022 | Itoh | G08G 1/096775 |
| 2022/0119012 A1* | 4/2022 | Agon | G06V 20/56 |
| 2022/0189301 A1* | 6/2022 | Nakazawa | G08G 1/09626 |
| 2022/0222946 A1* | 7/2022 | Sakai | B60W 30/0956 |
| 2022/0297713 A1* | 9/2022 | Wang | B60W 40/105 |
| 2022/0314982 A1 | 10/2022 | Matsumoto | |
| 2022/0388506 A1* | 12/2022 | Horiuchi | B60W 50/14 |
| 2022/0406179 A1* | 12/2022 | Kurehashi | G08G 1/167 |
| 2022/0406187 A1* | 12/2022 | Kurehashi | B60W 50/14 |
| 2023/0106686 A1* | 4/2023 | Nguyen Van | B60W 30/09 701/26 |
| 2023/0311656 A1* | 10/2023 | Yasui | B60K 35/29 701/36 |
| 2023/0311921 A1* | 10/2023 | Maruyama | G06V 20/58 340/435 |
| 2024/0272858 A1* | 8/2024 | Uchikoshi | B60W 50/14 |
| 2024/0308539 A1* | 9/2024 | Yasui | G08G 1/16 |
| 2025/0010719 A1* | 1/2025 | Yahata | B60K 35/28 |
| 2025/0018964 A1* | 1/2025 | Druml | B60W 40/08 |

* cited by examiner

| WARNING TARGET THAT IS RISK | SIGHT-LINE MOVEMENT AMOUNT | PRIORITY LEVEL GROUP |
|---|---|---|
| FIRST AUTOMOBILE | 0 DEGREES | HIGH |
| ON-ROAD OBJECT | −θ1 | LOW |
| FIRST MOTORCYCLE | θ2 | HIGH |
| SECOND MOTORCYCLE | θ3 | MEDIUM |
| THIRD MOTORCYCLE | −θ4 | LOW |
| FOURTH MOTORCYCLE | −θ5 | LOW |

30

ALREADY VISUALLY RECOGNIZED

TARGETS TO BE PUT IN GROUPS

| LOW PRIORITY LEVEL GROUP | | VISUAL RECOGNITION ORDER CANDIDATE | | | | | |
|---|---|---|---|---|---|---|---|
| | | No. 1 | No. 2 | No. 3 | No. 4 | No. 5 | No. 6 |
| ON-ROAD OBJECT | −θ1 | 1 | 1 | 2 | 3 | 3 | 2 |
| THIRD MOTORCYCLE | −θ4 | 2 | 3 | 1 | 1 | 2 | 3 |
| FOURTH MOTORCYCLE | −θ5 | 3 | 2 | 3 | 2 | 1 | 1 |

SELECT AS WARNING ORDER

FIG. 7

VEHICLE OUTSIDE RISK VISUAL RECOGNITION GUIDING APPARATUS

CROSS-REFERENCE TO RELATED APPLICATIONS

The present application claims priority from Japanese Patent Application No. 2022-113519 filed on Jul. 14, 2022, the entire contents of which are hereby incorporated by reference.

BACKGROUND

The disclosure relates to a vehicle outside risk visual recognition guiding apparatus.

It may be desired that, while a driver drives a vehicle, the driver be careful of a risk outside the vehicle and recognize the risk.

However, the driver is a human. It is difficult for the driver to always be careful of and check, with his or her own willpower, all the possible risks outside the vehicle while the vehicle is traveling. For example, in a highly safe traveling environment, the driver can concentrate on driving of the vehicle without sufficiently paying attention to an outside of the vehicle. A risk outside the vehicle as a disturbance can still be present in such a case.

SUMMARY

An aspect of the disclosure provides a vehicle outside risk visual recognition guiding apparatus that includes an output unit, a vehicle inside detection device, and a processor. The output unit is configured to output a warning that allows a sight line of a driver of a vehicle to be guided to a risk outside the vehicle. The vehicle inside detection device is configured to detect information from which a sight-line direction of the driver of the vehicle is acquirable. The sight-line direction of the driver is a direction of the sight line of the driver. The processor is configured to acquire detected information that is the information detected by the vehicle inside detection device. The processor is configured to acquire the sight-line direction of the driver from the detected information acquired from the vehicle inside detection device. The processor is configured to calculate sight-line movement amounts based on the acquired sight-line direction of the driver as a reference. The sight-line movement amounts are each an amount by which the sight line is caused to move to visually recognize any one of warning targets that are risks outside the vehicle. The processor is configured to determine a warning order related to the risks outside the vehicle at least based on the sight-line movement amounts by which the sight line is caused to move from the acquired sight-line direction of the driver to visually recognize the warning targets that are the risks. The warning order is an order in which the output unit is to output warnings about the risks outside the vehicle. The processor is configured to cause the output unit to output the warnings that allow the warning targets that are the risks outside the vehicle to be visually recognized in accordance with the determined warning order.

BRIEF DESCRIPTION OF THE DRAWINGS

The accompanying drawings are included to provide a further understanding of the disclosure, and are incorporated in and constitute a part of this specification. The drawings illustrate embodiments and, together with the specification, serve to explain the principles of the disclosure.

FIG. 6 is an explanatory diagram describing a warning schedule list to be stored in a memory.

FIG. 7 is an explanatory diagram describing visual recognition order candidates related to the warning targets that are the risks outside the vehicle.

DETAILED DESCRIPTION

Figure 1:
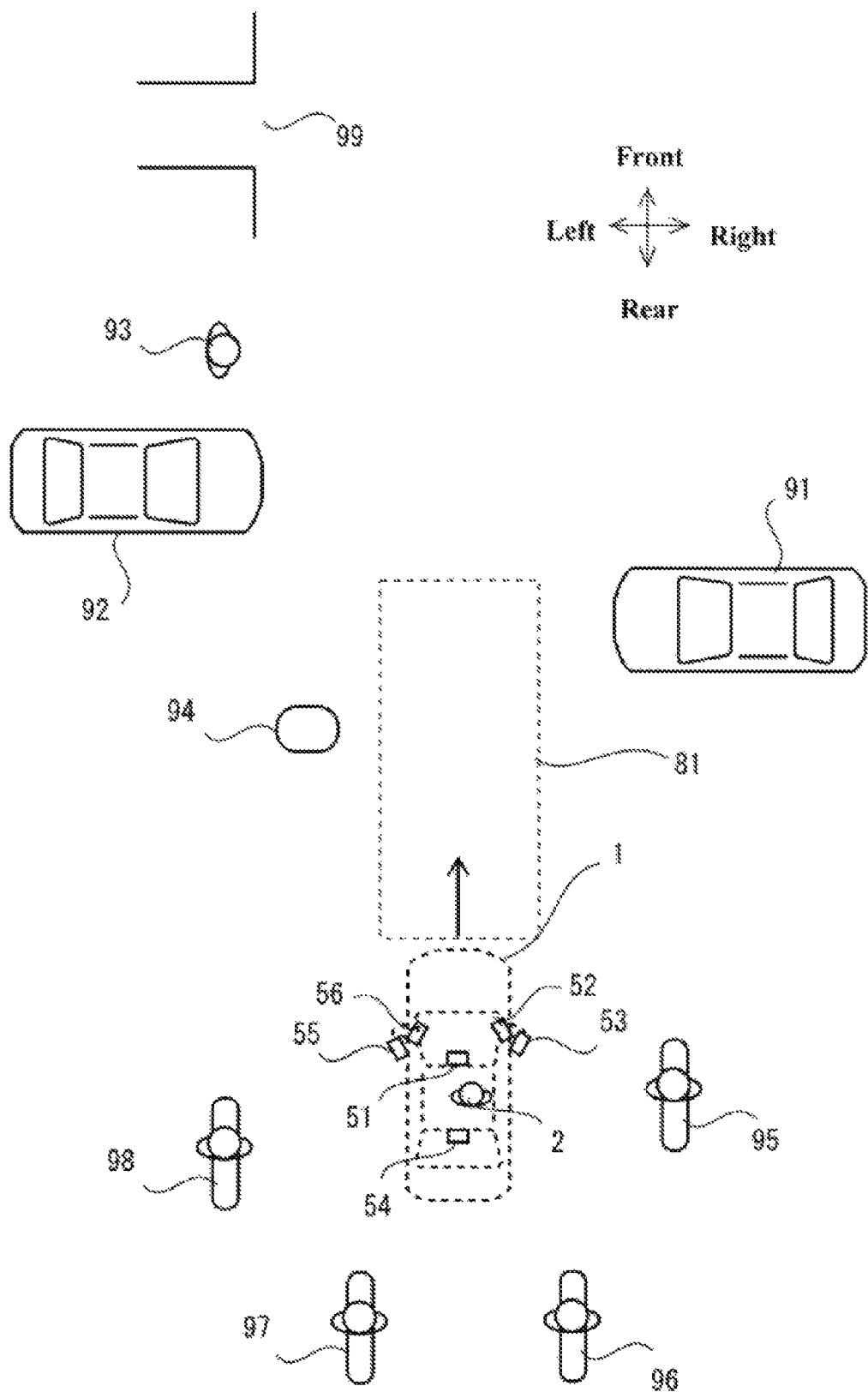
FIG. 1 is an explanatory diagram illustrating a vehicle to which a vehicle outside risk visual recognition guiding apparatus according to one example embodiment of the disclosure is to be applied, and also illustrating an example traveling environment of the vehicle.

Japanese Unexamined Patent Application Publication (JP-A) Nos. 2016-197407, 2007-065704, and 2021-174436 propose an assistance technique, related to a vehicle such as an automobile, of making a warning about a risk outside the vehicle while the vehicle is traveling and thereby assisting a driver to visually recognize a target that is the risk.

In JP-A Nos. 2016-197407 and 2007-065704, however, priority levels such as risk levels are set to risks outside the vehicle, and a warning is outputted about the risk having the highest priority level. In such a case, if there are multiple risks outside the vehicle, it is difficult to guide a sight line of the driver to all of the risks. It may be appropriate to output a warning about something that can be a high risk; however, it may be desired to output, for the driver, a warning also about a lower-level risk.

JP-A No. 2021-174436 discloses a technique of, when warning targets are present, making a change in outputting warnings depending on a recognition state of a driver.

It is desirable to provide a vehicle outside risk visual recognition guiding apparatus that, when multiple risks are present outside a vehicle, outputs warnings about the risks.

In the following, some example embodiments of the disclosure are described in detail with reference to the accompanying drawings. Note that the following description is directed to illustrative examples of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiments which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same reference numerals to avoid any redundant description. In addition, elements that are not directly related to any embodiment of the disclosure are unillustrated in the drawings.

First Example Embodiment

FIG. 1 is an explanatory diagram illustrating a vehicle 1 to which a vehicle outside risk visual recognition guiding apparatus according to a first example embodiment of the disclosure is to be applied, and also illustrating an example traveling environment of the vehicle 1. The vehicle 1 may be an example of a vehicle.

The vehicle 1 illustrated in FIG. 1 may allow a driver 2 to get therein and may be configured to travel in accordance with a driving operation performed by the driver 2. In addition, in one example, the vehicle 1 may be configured to assist the driving operation of the driver 2 to travel, or may be configured to travel based on an automatic control independently of the driving operation of the driver 2. During such traveling also, it may be desired that the driver 2 be careful, for example, of a risk outside the vehicle 1 and operate the traveling of the vehicle 1 so as to avoid the risk when the vehicle 1 is traveling.

However, the driver 2 is a human. It may be difficult for the driver 2 to always be careful of and check, with his or her own willpower, all the possible risks outside the vehicle 1 while the vehicle 1 is traveling. For example, in a highly safe traveling environment, the driver 2 can concentrate on driving of the vehicle 1 without sufficiently paying attention to an outside of the vehicle 1. A risk outside the vehicle 1 as a disturbance can still be present in such a case.

For example, around a region on a front side of the vehicle 1 illustrated in FIG. 1, a first automobile 91 or a second automobile 92, a pedestrian 93, or any other object may be present. The first automobile 91 and the second automobile 92 may be vehicles other than the vehicle 1. The vehicles other than the vehicle 1 and the pedestrian 93 may move across the region on the front side of the vehicle 1.

In a region on a rear side of the vehicle 1 illustrated in FIG. 1, a first motorcycle 95, a second motorcycle 96, a third motorcycle 98, a fourth motorcycle 97, and any other object may be present. The first motorcycle 95, the second motorcycle 96, the third motorcycle 98, and the fourth motorcycle 97 may be vehicles other than the vehicle 1. The first motorcycle 95, the second motorcycle 96, the third motorcycle 98, and the fourth motorcycle 97 having high mobility may travel through a side region of the vehicle 1 and pass the vehicle 1.

In a place such as a road on which the vehicle 1 travels, an on-road object 94 may be present. Non-limiting examples of the on-road object 94 may include a fallen object, a stone, a post, and a step. An exit 99 of another road such as an alley may be connected to the place such as the road on which the vehicle 1 travels. From the exit 99 of the alley, another vehicle or the pedestrian 93 may come out. The road on which the vehicle 1 travels may be provided with, for example but not limited to, a traffic light, a crosswalk, or an intersection with another road. The driver 2 may be to be careful of both a risky object that is moving outside the vehicle 1 and a risky object that is present outside the vehicle 1 on the road without moving.

As described above, various risks can be present outside the vehicle 1 while the vehicle 1 is traveling. In addition, multiple risks can be present at the same time outside the vehicle 1. It is expectable that the vehicle 1 outputting warnings about these risks outside the vehicle 1 helps to reduce a load on the driver 2.

Figure 2:
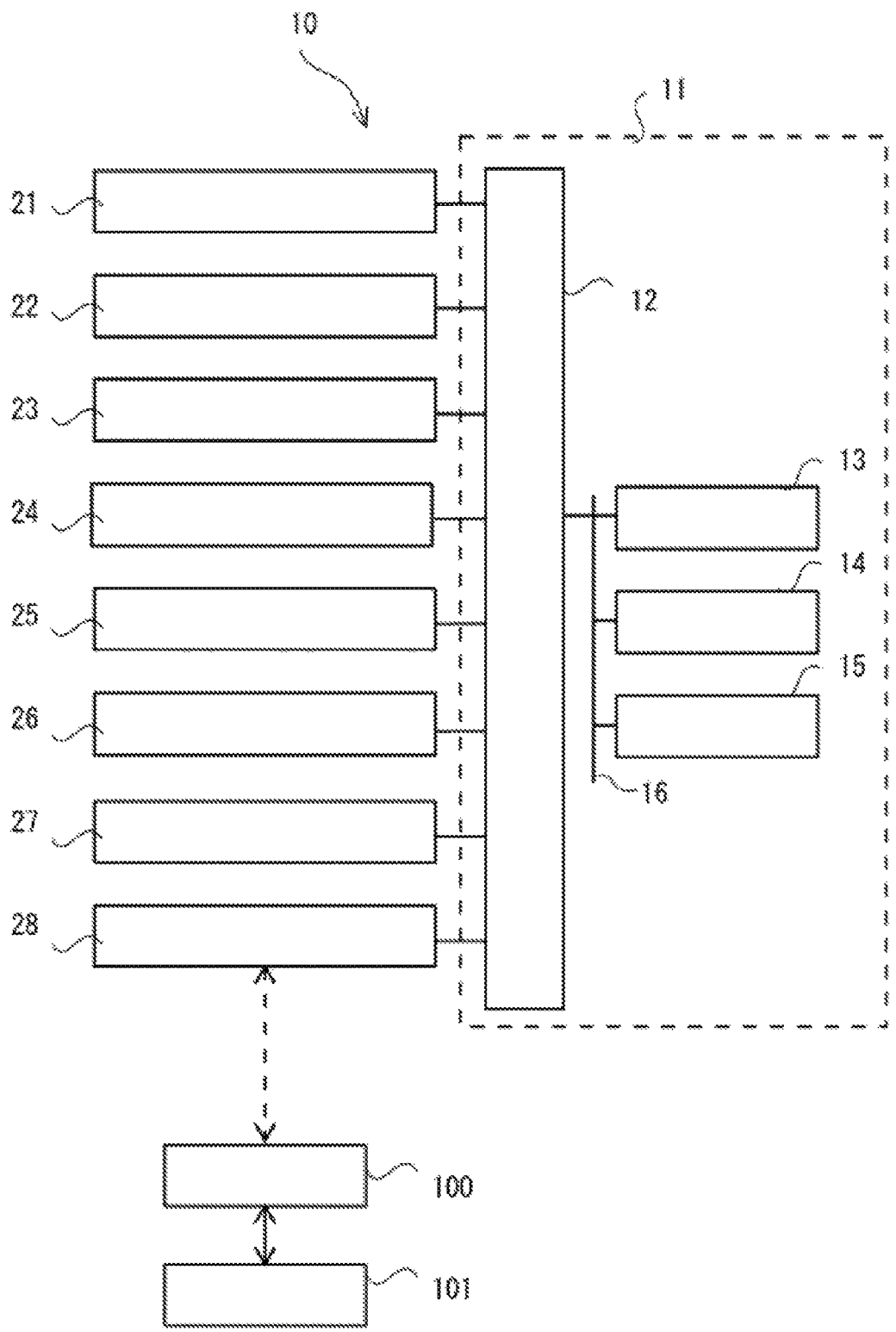
FIG. 2 is an explanatory diagram illustrating a control system, of the vehicle illustrated in FIG. 1, that serves as the vehicle outside risk visual recognition guiding apparatus.

FIG. 2 is an explanatory diagram illustrating a control system 10 of the vehicle 1 illustrated in FIG. 1. In one embodiment, the control system 10 may serve as a "vehicle outside risk visual recognition guiding apparatus".

The control system 10 illustrated in FIG. 2 may include a control apparatus 11. The control apparatus 11 may include an input and output unit 12, a timer 13, a memory 14, an electronic control unit (ECU) 15, and a system bus 16. The input and output unit 12, the timer 13, the memory 14, and the ECU 15 may be coupled to the system bus 16. A vehicle outside camera 21, a vehicle outside radar 22, a vehicle inside camera 23, a digital outer mirror 24, a rear-view monitor a meter monitor 26, a speaker 27, and a vehicle outside communication device 28 may be coupled, as vehicle devices, to the input and output unit 12.

The input and output unit 12 may be, for example, an input/output interface of the control apparatus 11. The input and output unit 12 may receive various kinds of information to be used in the control apparatus 11, and may output various kinds of information generated by the control apparatus 11. In the control system 10 of the vehicle 1, respective input and output units 12 of multiple control apparatuses, including the control apparatus 11 of the vehicle outside risk visual recognition guiding apparatus described above, may be coupled to an unillustrated vehicle network. In one example, the vehicle devices described above may be coupled to a control apparatus other than the control apparatus 11 of the vehicle outside risk visual recognition guiding apparatus. In such a case, the vehicle network and the control apparatus coupled thereto may be included as a portion of the input and output unit 12.

The vehicle outside camera 21 may capture an image of the outside of the vehicle 1. For example, the vehicle outside camera 21 may capture an image of the outside of the vehicle 1 in a 360-degree range around the vehicle 1. For example, as illustrated in FIG. 1, the cameras provided to the vehicle 1 may include a front camera 51, a right-front camera 52, a right-rear camera 53, a rear camera 54, a left-rear camera 55, and a left-front camera 56. The front camera 51 may capture an image of a region on the front side of the vehicle 1. The right-front camera 52 may capture an image of a region on a right-front side of the vehicle 1. The right-rear camera 53 may capture an image of a region on a right-rear side of the vehicle 1. The rear camera 54 may capture an image of a region on the rear side of the vehicle 1. The left-rear camera 55 may capture an image of a region on a left-rear side of the vehicle 1. The left-front camera 56 may capture an image of a region on a left-front side of the vehicle 1. These cameras may allow for capturing images of the outside of the vehicle 1 in the 360-degree range around the vehicle 1.

The image of the outside of the vehicle 1 captured by the vehicle outside camera 21 may include a risk, or a warning target which is a risk, that is present outside and around the vehicle 1, for example, as illustrated in FIG. 1.

The vehicle outside radar 22 may detect a target present around the vehicle 1 by a signal wave such as a millimeter wave. The vehicle outside radar 22 may output the signal wave such as the millimeter wave, and based on a direction and a timing of reception of the reflected signal wave, detect a direction of the target and a distance to the target relative to the vehicle 1 as a reference. A result of the detection of the outside of the vehicle 1 performed by the vehicle outside radar 22 may include a risk, or a warning target which is a risk, that is present outside and around the vehicle 1, for example, as illustrated in FIG. 1.

The vehicle inside camera 23 may capture an image of the driver 2 present inside the vehicle 1. The image captured by the vehicle inside camera 23 may include an image component of a part such as a face or an eye of the driver 2 relative to the vehicle inside camera 23 as a reference. In one example, the vehicle inside camera 23 may be provided in a middle part in a right-left direction of the vehicle 1. In this case, an image of the face of the driver 2 facing toward the front side of the vehicle 1 may be captured, by the vehicle inside camera 23, obliquely at a predetermined angle. The predetermined angle may be determined by relative positions of the face of the driver 2 and the vehicle inside camera 23. A direction of a part such as the face or the eye of the driver 2 may be identified by analyzing the image captured by the vehicle inside camera 23.

In one example, the vehicle inside camera 23 may include, for example, a near-infrared light-emitting diode (LED). In this case, the image captured by the vehicle inside camera 23 may include an image component of the driver 2 based on visible light and an image component of the driver 2 based on near-infrared rays. A temporal change in the image component of the driver 2 based on the near-infrared rays may include a change component of an image derived from a heartbeat of the driver 2. Such a vehicle inside camera 23 may detect information from which a sight-line direction of the driver 2 of the vehicle 1 is acquirable. In one embodiment, the vehicle inside camera 23 may serve as a "vehicle inside detection device".

The digital outer mirror 24 may be a display device that displays, toward the driver 2, an image of the region on the right side of the vehicle 1 captured by the right-rear camera 53 provided on the right side of the vehicle 1 and an image of the region on the left side of the vehicle 1 captured by the left-rear camera 55 provided on the left side of the vehicle 1. In one example, the digital outer mirror 24 may include monitors embedded, for example, in lower end portions of right and left A-pillars of the vehicle 1, and may display the images of the regions on the right and left sides of the vehicle 1 with use of the monitors. By displaying the images of the regions on the right and left sides of the vehicle 1 at such positions, the digital outer mirror 24 may be able to display the images of the regions outside of and on the right and left sides of the vehicle 1 at visual recognition positions similar to those of existing right and left reflective door mirrors.

The rear-view monitor 25 may be a display device that displays, toward the driver 2, an image of the region on the rear side of the vehicle 1 captured by the rear camera 54 provided at a rear portion of the vehicle 1. In one example, as with a reflective room mirror, the rear-view monitor 25 may be provided in a middle part in the right-left direction of the vehicle 1. By being provided at such a position, the rear-view monitor 25 may be able to display the image of the region outside of and on the rear side of the vehicle 1 at a visual recognition position similar to that of the reflective room mirror provided at an upper middle part in the right-left direction of the vehicle 1.

The meter monitor 26 may be a display device provided in front of the driver 2. In one example, the meter monitor 26 may display images including, without limitation, the images captured by the right-rear camera 53, the left-rear camera 55, and the rear camera 54 provided on the vehicle 1. In this case, the driver 2 may be able to check the image of the region outside of and on the right-rear side of the vehicle 1, the image of the region outside of and on the left-rear side of the vehicle 1, and the image of the region outside of and on the rear side of the vehicle 1 in the meter monitor 26 in front of the driver 2.

The speaker 27 may be an output device that outputs a sound such as a synthesized voice toward the driver 2 of the vehicle 1. The speaker 27 may serve to output a warning that allows a sight line of the driver 2 of the vehicle 1 to be guided to a risk outside the vehicle 1. In one embodiment, the speaker 27 may serve as an "output unit".

The vehicle outside communication device 28 may establish a wireless communication line with, for example, a base station 100 outside the vehicle 1. In one example, the base station 100 may be coupled to a carrier communication network. In another example, the base station 100 may be a base station for next-generation intelligent transport systems (ITS). In addition, the base station 100 may establish a wireless communication line with another mobile body such as another vehicle, in one example. In one example, the vehicle outside communication device 28 may transmit various kinds of information to a server apparatus 101 coupled to the base station 100 and receive various kinds of information from the server apparatus 101 through the wireless communication line established between the vehicle outside communication device 28 and, for example, the base station 100.

The timer 13 may measure a time period and a time.

The memory 14 may store, for example but not limited to, a program to be executed by the ECU 15 and information as data. In one example, the memory 14 may include storage devices including, without limitation, a random-access memory (RAM), a read-only memory (ROM), a hard disk drive (HDD), and a solid state drive (SSD). The RAM may be a volatile semiconductor memory that allows for high-speed random access. The ROM and the SSD may each be a semiconductor memory that allows for non-volatile recording of data such as a program. The HDD may be a device that allows for non-volatile recording of data such as a program on a magnetic disk.

The ECU 15 may read and execute the program stored in the memory 14. This may allow the ECU 15 to serve as a controller in the control system 10 of the vehicle 1 illustrated in FIG. 2. In one embodiment, the ECU 15 may serve as a "processor". The ECU 15 may control respective operations of the timer 13, the memory 14, and the input and output unit 12 coupled to the system bus 16, and various vehicle devices coupled to the input and output unit 12 and thereby implement a vehicle outside risk visual recognition guiding apparatus in the control system 10.

For example, the ECU 15 may acquire information detected by the detection devices outside the vehicle 1, and detect a warning target that is a risk outside the vehicle 1. The detection device outside the vehicle 1 may include, for example but not limited to, the vehicle outside camera 21 and the vehicle outside radar 22 provided on the vehicle 1.

When a risk about which the driver 2 of the vehicle 1 is to be warned is present outside the vehicle 1, the ECU 15 may cause any of the output units including, without limitation, the speaker 27 and the meter monitor 26 to output a warning that allows the sight line of the driver 2 to be guided to the warning target that is the risk outside the vehicle 1.

The number of risks about which the driver 2 of the vehicle 1 is to be warned is not necessarily one. When multiple risks about which the driver 2 is to be warned are present outside the vehicle 1, the ECU 15 may determine a warning order, i.e., the order of outputting the warnings about the risks outside the vehicle 1 about which the driver 2 is to be warned, based on determinations on various conditions, and may cause the warnings to be outputted in accordance with the determined warning order. If the warnings about the multiple risks outside the vehicle 1 about which the driver 2 is to be warned are outputted at the same time, the driver 2 may be put in a position to determine the priorities of the risks or the checking order of the risks by himself or herself and to check the risks in order. This can be a heavy load on the driver 2. Further, some drivers 2 can be confused to understand the situation if the warnings about the multiple risks outside the vehicle 1 are outputted at the same time. It may be desired that the number of warnings to be outputted at the same time be small. It may also be desired that the warnings about the risks outside the vehicle 1 be recognized by the driver 2 efficiently, with a higher risk being given priority over a lower risk as far as possible.

The image captured by the vehicle inside camera 23 may include a head of the driver 2. The ECU 15 may acquire a direction of a part such as the face or the eye of the driver 2 based on the image captured by the vehicle inside camera 23. In this case, the ECU 15 may be able to use the direction of the part such as the face or the eye of the driver 2 as the sight-line direction of the driver 2 and thereby identify the warning target which is the risk outside the vehicle 1 that is visually recognized by the driver 2. In addition, the ECU 15 may acquire a heart rate of the driver 2 based on the image captured by the vehicle inside camera 23. In this case, the ECU 15 may be able to determine a change in mental and physical conditions of the driver 2 having visually recognized the warning target that is the risk outside the vehicle 1, based on, for example, an increase in the heart rate of the driver 2.

Figure 3:
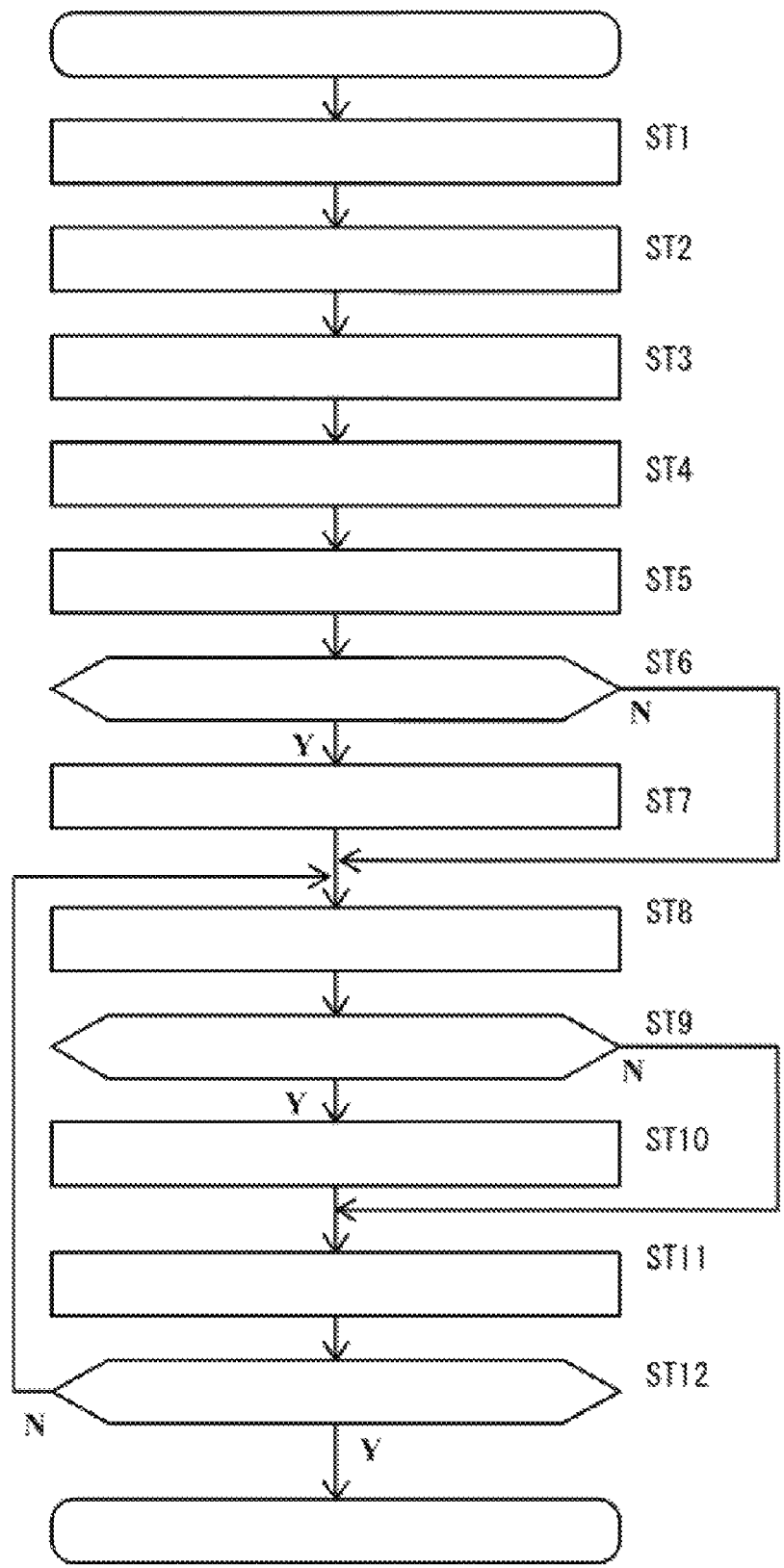
FIG. 3 is a flowchart of a risk recognition guiding control to be executed by an ECU illustrated in FIG. 2.

FIG. 3 is a flowchart of an example of a risk recognition guiding control to be executed by the ECU 15 illustrated in FIG. 2.

The ECU 15 illustrated in FIG. 2 may repeatedly execute the risk recognition guiding control in FIG. 3 at least when the vehicle 1 is traveling. In one example, the ECU 15 may repeatedly execute the risk recognition guiding control in FIG. 3 when the driver 2 is present in the vehicle 1.

In step ST1, the ECU 15 may acquire a captured image, as detected information related to the outside of the vehicle 1, for example, from the vehicle outside camera 21 of the vehicle 1. In one example, the ECU 15 may acquire the detected information related to the outside of the vehicle 1 from the vehicle outside radar 22.

In step ST2, the ECU 15 may extract and detect a warning target, which is present around the vehicle 1 and is a risk outside the vehicle 1, from the detected information related to the outside of the vehicle 1 acquired in step ST1. The ECU 15 may thereby detect, as the risk outside the vehicle 1, for example, a mobile body such as an automobile or a motor cycle, the pedestrian 93, or the on-road object 94, as illustrated in FIG. 1. The kind of the warning target to be extracted here may be determined in advance.

The captured image of the outside of the vehicle 1 may include, for example, an image of an automobile moving around the vehicle 1. Multiple images captured in succession in a short time period in which a large movement does not occur may basically overlap with each other if the images do not include, for example, a moving object. The images may not overlap with each other in a portion including a moving object. By analyzing image components in such non-overlapping portions of the images, the ECU 15 may be able to extract an object moving around the vehicle 1, such as an automobile. In analyzing the image components, the ECU 15 may refer to an image pattern for each warning target such as an automobile, and may estimate that the warning target is of an attribute having the most matched pattern.

The detected information related to the outside of the vehicle 1 obtained by the vehicle outside radar 22 may include a component of a reflected wave from an object present around the vehicle 1. In one example, the ECU 15 may determine a difference between the acquired detected information related to the outside of the vehicle 1 and detected information of the outside of the vehicle 1 in an environment in which no object is present around the vehicle 1, assume that the determined difference derives from the warning target, and thus detect the object present around the vehicle 1. In another example, the ECU 15 may compare a difference component of the reflected wave with a difference pattern for each warning target such as an automobile, and may estimate that a warning target of an attribute having the most matched pattern is present.

Further, in one example, the ECU 15 may sort out pieces of information related to the one or more risks outside the vehicle 1 detected in step ST2 for each risk, and may store those pieces of information in the memory 14.

In step ST3, the ECU 15 may add basic information to the information related to each of the one or more risks outside the vehicle 1 detected in step ST2. The basic information may be used to determine, for example, the warning order to be used in a warning control. Here, the ECU 15 may add information related to a visual recognition direction of the warning target and information related to a priority level for outputting warnings to the information related to each of the one or more risks.

The visual recognition direction of the warning target may refer to, for example, a direction into which the sight line of the driver 2 of the vehicle 1 is turned when the driver 2 directly views the warning target. The visual recognition direction at this stage may be expressed, for example, by an angle with respect to the front of the vehicle 1 as a reference. In this case, the visual recognition direction of the warning target present on the right side of the vehicle 1 may be expressed by a positive angle. The visual recognition direction of the warning target present on the left side of the vehicle 1 may be expressed by a negative angle. The ECU 15 may acquire a direction of the warning target relative to the vehicle 1 as a reference, based on any of a position at which the warning target is captured in the captured image of the outside of the vehicle 1 and the detected information related to the warning target obtained by the vehicle outside radar 22. In one example, the ECU 15 may use the acquired direction as a direction into which the sight line of the driver 2 of the vehicle 1 is turned when the driver 2 directly views the warning target.

The priority level for outputting warnings may refer to an index based on which the order of outputting the warnings toward the driver 2 is changed, for example, an index based on which the order of the warning to be outputted is made earlier or later. The warning targets that are the risks outside the vehicle 1 may be classified into multiple kinds, for example, based on a possibility of influencing the traveling of the vehicle 1. For example, the warning targets may be classified into those of a high risk, those of a medium risk, and those of a low risk. In this case, a high priority level may be set to the warning target of the high risk which is to be checked immediately. A medium priority level may be set to the warning target of the medium risk which is to be checked normally. A low priority level may be set to the warning target of the low risk which is to be checked just in case. In one example, the ECU 15 may determine the priority level of each warning target depending on, for example, any of a relative position or distance of the warning target, a traveling state of the vehicle 1 with respect to the warning target, and an operation state of the vehicle 1. Note that the number of kinds of the priority levels is not limited to three.

The ECU 15 may add the above-described pieces of additional information to corresponding pieces of information related to the risk outside the vehicle 1 stored in the memory 14 for each risk.

In step ST4, the ECU 15 may put the pieces of information related to the one or more risks outside the vehicle 1 that have been detected in step ST2 into groups based on the priority levels. In one example, the ECU 15 may sort out, in descending order of the priority levels, the pieces of information related to the risks outside the vehicle 1 that are stored in the memory 14 for the respective risks. As a result, the pieces of information related to the risks outside the vehicle 1 may be stored in the memory 14 in descending order of the priority levels. In one warning schedule list 30 stored in the memory 14, the pieces of information related to the risks outside the vehicle 1 may be put into groups in descending order of the priority levels.

In step ST5, the ECU 15 may acquire a current sight-line direction of the driver 2. In one example, the ECU 15 may analyze the latest image captured by the vehicle inside camera 23 serving as the vehicle inside detection device, and may acquire the direction of the face or the eye of the driver 2 as the current sight-line direction of the driver 2.

In step ST6, the ECU 15 may determine whether an already-recognized risk is present. The already-recognized risk may be a risk which the driver 2 has already recognized. In one example, with use of the sight-line direction acquired in step ST5, the ECU 15 may determine, as the already-recognized risk, the waring target that is the risk outside the vehicle 1 present in the acquired sight-line direction. In another example, the ECU 15 may determine, as the already-recognized risk, the warning target that is the risk outside the vehicle 1 about which a warning has already been outputted in or before the previous risk recognition guiding control. If the already-recognized risk is present (step ST6: Y), the ECU 15 may proceed the process to step ST7. If the already-recognized risk is not present (step ST6: N), the ECU 15 may skip step ST7 and proceed the process to step ST8.

In step ST7, the ECU 15 may execute a process of excluding the already-recognized risk determined in step ST6 from the warning targets. For example, the ECU 15 may set to skip outputting a warning for the already-recognized risk in the one warning schedule list 30 stored in the memory 14.

In processes in and after step ST8, the ECU 15 may determine the warning order related to the risks outside the vehicle 1, and may actually cause warnings to be outputted in accordance with the determined warning order. First, the ECU 15 may select a high priority level group which has not yet been subjected to processing. By the starting of the process in step ST8, the pieces of information related to the one or more risks outside the vehicle 1 may be sort out and stored in the memory 14 in descending order of the priority levels. Out of the pieces of information related to the risks outside the vehicle 1 stored in the memory 14, the ECU 15 may acquire information related to the risk outside the vehicle 1 on the top and information related to the risk outside the vehicle 1 having the same priority level, i.e., having the priority level which is not different from that of the information related to the risk outside the vehicle 1 on the top. The ECU 15 may thus select the high priority level group which has not yet been subjected to processing.

In step ST9, the ECU 15 may determine whether multiple unrecognized risks are present among the one or more risks outside the vehicle 1 in the group acquired in step ST8. The ECU may set to skip the outputting of a warning for the already-recognized risk in step ST7. In this case, for example, the ECU 15 may determine whether multiple unrecognized risks are present by determining whether multiple risks for which the skipping of the outputting of a warning is not set are present among the acquired one or more risks outside the vehicle 1.

If multiple unrecognized risks are present (step ST9: Y), the ECU 15 may proceed the process to step ST10 to determine the warning order for the unrecognized risks.

If the number of the unrecognized risks is one (step ST9: N), the ECU 15 may proceed the process to step ST11 to output a warning without determining the warning order.

In step ST10, the ECU 15 may determine the warning order for the unrecognized risks. A warning order determination control will be described later.

In step ST11, the ECU 15 may cause one or more warnings to be outputted for the one or more unrecognized risks. For example, the ECU 15 may cause the speaker 27 to output a synthesized voice that guides the visual recognition direction of the warning target that is the risk. The ECU may cause the meter monitor 26 to output a guidance display indicating the visual recognition direction of the warning target that is the risk. The driver 2 may look in the visual recognition direction in accordance with any of the voice and the display. This may allow the driver 2 to visually recognize the warning target that is the risk present in the visual recognition direction.

In step ST12, the ECU 15 may determine whether warnings have been outputted for all groups of the unrecognized risks. If any group remains not being subjected to the processing (step ST12: N), the ECU 15 may return the process to step ST8. The ECU 15 may repeat the processes from step ST8 to step ST12 until the ECU 15 determines that no group remains not being subjected to the processing in step ST12. The ECU 15 may thus be able to sequentially output warnings about the warning targets that are the risks outside the vehicle 1 belonging to multiple groups in order based on the priority levels. In addition, the ECU 15 may allow for outputting, in accordance with the warning order, warnings about the warning targets which are the risks outside the vehicle 1 having the same priority level, i.e., having the priority levels that are not different from each other.

Figure 4:
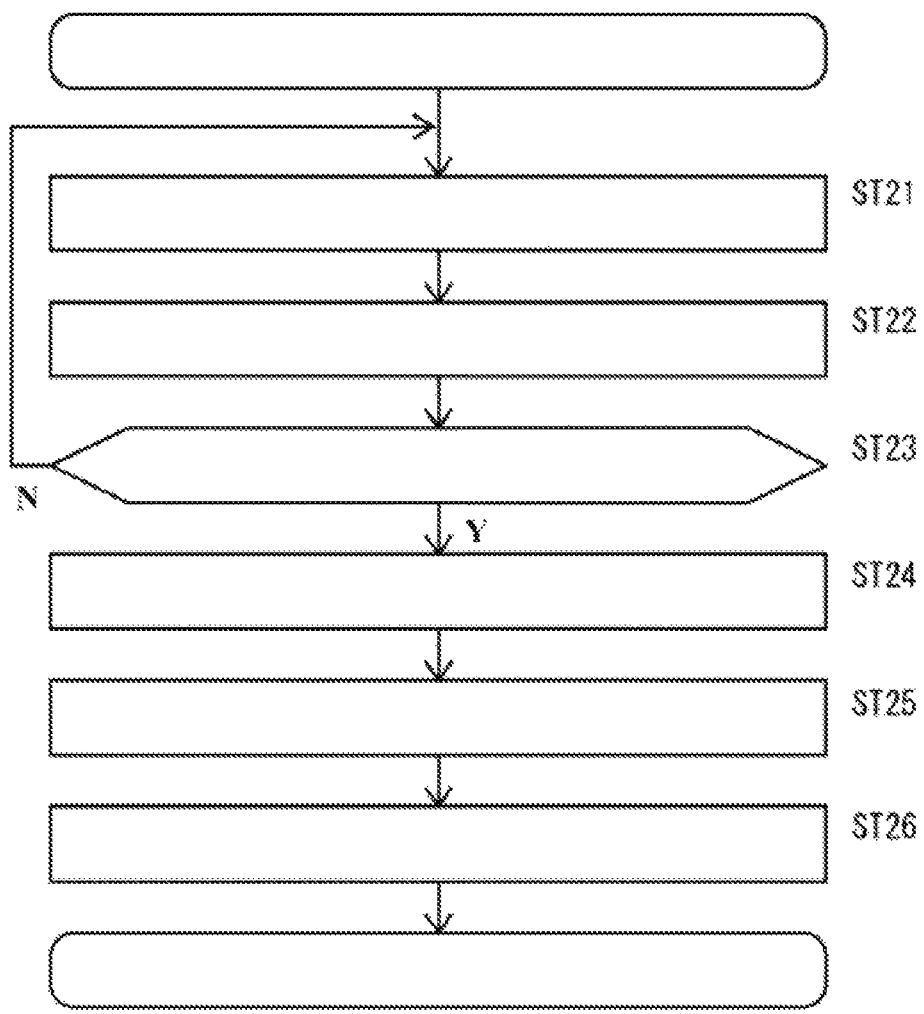
FIG. 4 is a detailed flowchart of a warning order determination control described in FIG. 3.

FIG. 4 is a detailed flowchart of an example of the warning order determination control described in FIG. 3.

In one example, the ECU 15 may execute the warning order determination control described in FIG. 4 in step ST10 in FIG. 3.

In step ST21, the ECU 15 may select one warning target not yet subjected to processing from the warning targets to be the acquired risks outside the vehicle 1.

In step ST22, the ECU 15 may calculate a sight-line movement amount related to the warning target selected in step ST21.

The information related to the risk outside the vehicle 1 stored in the memory 14 may include information related to the sight-line direction of the warning target relative to the vehicle 1 as a reference. In one example, the sight-line direction of the warning target relative to the vehicle 1 as the reference may be an angle formed by a direction of a position of the warning target relative to the front of the vehicle 1 as a reference.

The ECU 15 may have acquired the current sight-line direction of the driver 2 in step ST5. In one example, the current sight-line direction of the driver 2 may be the latest sight-line direction of the driver 2 relative to the front of the vehicle 1 as a reference.

In one example, the ECU 15 may calculate, as the sight-line movement amount, an angle by which the sight line is caused to move so as to be turned to the sight-line direction of the selected warning target from the current sight-line direction of the driver 2 as a reference. Thus, the sight-line movement amount may refer to an angle by which the driver 2 is caused to move his or her sight line from the current sight-line direction to a direction of the position where the warning target is present.

In one example, in addition to a direct-view sight-line movement amount, i.e., the sight-line movement amount by which the sight line is caused to move to directly view the selected warning target, the ECU 15 may also calculate, as an indirect-view sight-line movement amount, an angle by which the sight line is caused to move to indirectly visually recognize the selected warning target in any of the various mirrors and monitors provided to the vehicle 1. The vehicle outside camera 21 may basically capture an image in a 360-degree range around the vehicle 1. The image captured by the vehicle outside camera 21 may include an image of the selected warning target. For example, the image of the warning target may be displayed on any of the digital outer mirror 24, the rear-view monitor 25, and the meter monitor 26. This may allow the driver 2 to indirectly visually recognize the warning target. Depending on a relative position of the warning target, the warning target may be seen in any of the reflective room mirror and the reflective side mirrors. In one example, the ECU 15 may calculate, as the indirect-view sight-line movement amount, an angle by which the sight line is caused to move to be turned to the selected mirror or monitor from the current sight-line direction of the driver 2 as a reference. For example, the ECU 15 may select the mirror or the monitor that is able to display the warning target which is the risk, based on the direct-view visual recognition direction of each warning target that is the risk, and may calculate the indirect-view sight-line movement amount related to the selected mirror or monitor. It may not always be the case depending on the current sight-line direction of the driver 2, it is expectable that the indirect-view sight-line movement amount tends to be less than the direct-view sight-line movement amount. The combination use of the direct-view sight-line movement amount and the indirect-view sight-line movement amount may help to reduce a total movement of the sight line of the driver 2 who is to visually recognize multiple warning targets that are the risks outside the vehicle 1.

In step ST23, the ECU 15 may determine whether the selection from the warning targets that are the acquired risks outside the vehicle 1 is completed. If any warning target remains not being subjected to processing (ST23: N), the ECU 15 may determine that the selection is not completed, and may return the process to step ST21. The ECU 15 may repeat the processes from step ST21 to step ST23 until the ECU 15 determines that the selection is completed, and may calculate the sight-line movement amounts related to the warning targets that are the acquired risks outside the vehicle 1. When the ECU 15 determines that the selection is completed (step ST23: Y), the ECU 15 may proceed the process to step ST24.

In step ST24, the ECU 15 may generate visual recognition order candidates.

The visual recognition order candidate may refer to an order to visually recognize the warning targets that are the acquired risks outside the vehicle 1. In the visual recognition order candidate, the warning targets that are the acquired risks outside the vehicle 1 may be stored in order by which the warning targets are to be visually recognized, for example. In step ST26 which will be described later, the ECU 15 may select one of the visual recognition order candidates as the warning order to be used when warnings are actually outputted.

For example, if two warning targets that are risks outside the vehicle 1 are present, basically, the ECU 15 may generate two visual recognition order candidates.

For example, if three warning targets that are risks outside the vehicle 1 are present, basically, the ECU 15 may generate six visual recognition order candidates.

For example, if the direct-view sight-line movement amount and the indirect-view sight-line movement amount have been calculated for each warning target, basically, the ECU 15 may generate twice the number of visual recognition order candidates described above.

In each of the visual recognition order candidates, each of the warning targets that are the risks outside the vehicle 1 may be visually recognized once.

In step ST25, the ECU 15 may calculate a total sight-line movement amount in a case where the driver 2 moves his or her sight line in accordance with a visual recognition order in each of the visual recognition order candidates generated in step ST24. The ECU 15 may thus calculate the total sight-line movement amount in a case where the warning targets that are the risks outside the vehicle 1 are visually recognized in the order in each of the visual recognition order candidates from a sight-line position in the current sight-line direction of the driver 2, for example.

In step ST26, the ECU 15 may select one of the generated visual recognition order candidates as the warning order to be used when warnings are actually outputted. In one example, the ECU 15 may select, as the warning order, the visual recognition order candidate that is the smallest in absolute value of the total sight-line movement amount.

It is assumable that the decrease in the absolute value of the total sight-line movement amount allows for a decrease in the load on the driver 2 at the time when the driver 2 visually recognizes the warning targets that are the risks outside the vehicle 1 in order. It is assumable that the load on the driver 2 checking the warning targets is lower when the sight line of the driver 2 is guided in order from one side to another side in the right-left direction than when the sight line of the driver 2 is repeatedly guided from one side to another side and from the other side to the one side in the right-left direction.

The ECU 15 may store information related to the selected warning order in the memory 14.

Thereafter, the ECU 15 may return the process to FIG. 3.

Note that when executing, in step ST10 in FIG. 3, the warning order determination control described in FIG. 4, the ECU 15 may not handle the warning targets that are the risks outside the vehicle 1 uniformly as those having the same priority level, but may handle the warning targets based on a unit of priority level group. The ECU 15 may determine the warning order for each of the priority level groups. For each of the priority level groups, the ECU 15 may determine the warning order in the group based on the sight-line movement amounts. When the risks outside the vehicle 1 includes a high-risk warning target which is to be given priority in warning over other warning targets, the ECU 15 may cause the warnings to be outputted in order taking into such a situation and guide the sight line by the minimum sight-line movement amount.

Further, in FIG. 4, when the number of the warning targets that are the risks outside the vehicle 1 excluding the risk present in the sight-line direction of the driver 2 is two or more, the ECU 15 may calculate the sight-line movement amounts and thereby determine the warning order. The ECU 15 may avoid guiding the sight line of the driver 2 to the warning target that is the risk outside the vehicle 1 which the driver 2 has probably already turned his or her sight line to and recognized. This may help to reduce the load on the driver 2.

Next, a description is given of an example of a control of generating the warning order for each example traveling environment of the vehicle 1.

Figure 5:
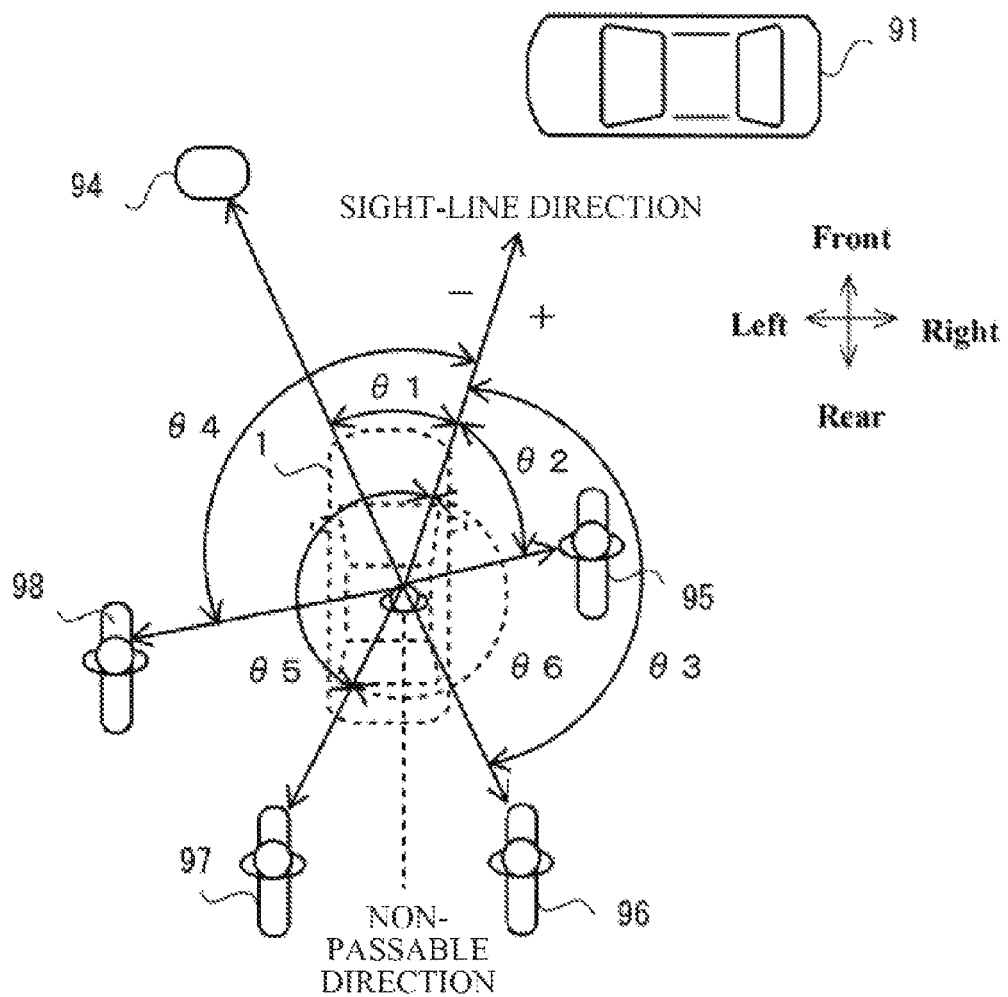
FIG. 5 is an explanatory diagram illustrating a corresponding relationship between a sight-line direction and a sight-line movement amount related to a warning target that is each of risks in the example traveling environment of the vehicle illustrated in FIG. 1.

FIG. 5 is an explanatory diagram illustrating a corresponding relationship between the sight-line direction and the sight-line movement amount related to each of the warning targets that are the risks in the example traveling environment of the vehicle 1 illustrated in FIG. 1.

In the traveling environment illustrated in FIG. 5, the on-road object 94, the first automobile 91, the first motorcycle 95, the second motorcycle 96, the fourth motorcycle 97, and the third motorcycle 98 may be present as warning targets around the vehicle 1. In addition, the sight line of the driver 2 may be in the right-front direction in which the first automobile 91 is present.

In this case, the ECU 15 may calculate respective sight-line movement amounts related to the warning targets. For example, the ECU 15 may calculate that the sight-line movement amount to visually recognize the on-road object 94 is $-\theta 1$. The ECU 15 may calculate that the sight-line movement amount to visually recognize the first automobile 91 is 0. The ECU 15 may calculate that the sight-line movement amount to visually recognize the first motorcycle 95 is $+\theta 2$. The ECU 15 may calculate that the sight-line movement amount to visually recognize the second motorcycle 96 is $+\theta 3$. The ECU 15 may calculate that the sight-line movement amount to visually recognize the third motorcycle 98 is $-\theta 4$. The ECU 15 may calculate that the sight-line movement amount to visually recognize the fourth motorcycle 97 is $-\theta 5$.

In one example, the ECU 15 may calculate the respective sight-line movement amounts, related to the warning targets that are the risks, by which the sight line is caused to move in a direction not passing a rear direction of the vehicle 1. The rear direction of the vehicle 1 is indicated as a "non-passable direction" in FIG. 5. When the vehicle 1 is traveling, the driver 2 may be basically facing the front. In such a case, the part such as the face or the eye of the driver 2 may not be able to turn to pass a rear direction of the driver 2. For such a reason, the ECU 15 may calculate the respective sight-line movement amounts, related to the warning targets that are the risks, by which the sight line is caused to move in a direction not passing the rear direction of the vehicle 1. This may allow the calculated sight-line movement amount to be the sight-line movement amount by which the sight line of the driver 2 is able to be turned. This may help to prevent calculation of the sight-line movement amount by which the sight line of the driver 2 is guided to a direction in which the sight line of the driver 2 is not able to be turned.

In FIG. 5, both "$-\theta 5$" and "$+\theta 6$" are presented as the sight-line movement amount to visually recognize the fourth motorcycle 97 present on the rear side of the vehicle 1. However, if the ECU calculates that the sight-line movement amount is $+\theta 6$, the driver 2 may be to turn the part such as the face or the eye facing the front side of the vehicle 1 to the left side of the vehicle 1, causing the part such as the face or the eye to pass the rear direction of the vehicle 1.

FIG. 6 is an explanatory diagram illustrating the warning schedule list 30 to be stored in the memory 14.

The warning schedule list 30 presented in FIG. 6 may include a record of each of the warning targets that are the risks outside the vehicle 1 illustrated in FIG. 5. For example, the warning schedule list 30 presented in FIG. 6 may include a record of the first automobile 91, a record of the on-road object 94, a record of the first motorcycle 95, a record of the second motorcycle 96, a record of the third motorcycle 98, and a record of the fourth motorcycle 97. In this example, each of the records may include information related to an attribute of the warning target that is the risk, information related to the sight-line movement amount, and information indicating the priority level group. For example, the record of the first automobile 91 may include "first automobile 91" as the information related to the attribute of the warning target, "0 degree" as the information related to the sight-line movement amount, and "high" as the information indicating the priority level group. The record of the on-road object 94 may include "on-road object 94" as the information related to the attribute of the warning target, "$-\theta 1$" as the information related to the sight-line movement amount, and "low" as the information indicating the priority level group. The sight-line movement amounts may be the direct-view sight-line movement amounts.

The ECU 15 may store the warning schedule list 30 presented in FIG. 6 in the memory 14 in the process described in FIG. 4.

In the case of the warning schedule list 30 presented in FIG. 6, the sight-line movement amount in the record of the first automobile 91 in the first row may be less than or equal to a threshold. The ECU 15 may therefore determine that the driver 2 has already recognized the first automobile 91. In this case, the ECU 15 may generate the warning orders for the respective priority level groups regarding the warning targets that are the risks outside the vehicle 1 having the records in the second and subsequent rows in the warning schedule list 30. The records in the second and subsequent rows in the warning schedule list 30 may be put into groups for outputting warnings. In this example, the first motorcycle 95 may belong to a high priority level group. The second motorcycle 96 may belong to a medium priority level group. The on-road object 94, the third motorcycle 98, and the fourth motorcycle 97 may belong to a low priority level group.

FIG. 7 is an explanatory diagram illustrating a list 40 including visual recognition order candidates related to the warning targets that are the risks outside the vehicle 1.

The list 40 in FIG. 7 may include the warning targets that are the risks outside the vehicle 1 belonging to the low priority level group out of the warning schedule list 30 in FIG. 6. That is, the list 40 may include the on-road object 94, the third motorcycle 98, and the fourth motorcycle 97.

In the process described in FIG. 4, the ECU 15 may generate the visual recognition order candidates related to the warning targets that are the risks outside the vehicle 1 belonging to the low priority level group presented in FIG. 7. In this example, the number of the warning targets may be three. The ECU 15 may therefore generate six visual recognition order candidates for all possible visual recognition orders, as presented as No. 1 to No. 6 in FIG. 7.

In the visual recognition order candidate No. 1 presented in FIG. 7, the on-road object 94, the third motorcycle 98, and the fourth motorcycle 97 may be visually recognized in this order. In this case, the ECU 15 may calculate that the total sight-line movement amount is "ABS(−θ1)+ABS(−θ4−(−θ1))+ABS(−θ5−(−θ4))".

In the visual recognition order candidate No. 2 presented in FIG. 7, the on-road object 94, the fourth motorcycle 97, and the third motorcycle 98 may be visually recognized in this order. In this case, the ECU 15 may calculate that the total sight-line movement amount is "ABS(−θ1)+ABS(−θ5−(−θ1))+ABS(−θ4−(−θ5))".

Here, "ABS(x)" represents an absolute value of x.

In one example, by a similar calculation method, the ECU 15 may calculate the total sight-line movement amount related to each of the visual recognition order candidates No. 3 to No. 6 presented in FIG. 7.

In one example, the ECU 15 may store, in the memory 14, the list 40 of the visual recognition order candidates presented in FIG. 7 in the process described in FIG. 4.

In the case presented in FIG. 7, the total sight-line movement amount of the visual recognition order candidate No. 1 and the total sight-line movement amount of the visual recognition order candidate No. 5 may each be smaller than the total sight-line movement amount of each of the visual recognition order candidates of other numbers. In the case presented in FIG. 7, the smallest total sight-line movement amount may be achieved by the visual recognition order in which the sight line is caused to move in order from one toward the other of the warning targets that are the risks positioned at two opposite ends. When the driver 2 moves his or her sight line to visually recognize all of the warning targets that are the risks, the risks positioned at the two opposite ends may cause the driver 2 to move his or her sight line most.

In addition, the first warning target in the visual recognition order candidate No. 1 may be closer to the latest sight-line direction of the driver 2 than the first warning target in the visual recognition order candidate No. 5. In this case, the ECU 15 may select the visual recognition order candidate No. 1 as the warning order out of the visual recognition order candidates presented in FIG. 7.

If the determination is to be made including an indirect view of one of the warning targets that are the risks outside the vehicle 1, an indirect-view record may be added to the direct-view records presented in FIG. 7. The indirect view of a warning target may refer to visual recognition of the warning target in any of the mirrors and monitors provided to the vehicle 1. The number of the indirect-view records to be added may not be limited to one, and may be two or more. The ECU 15 may so generate the visual recognition order candidates as to include both the direct-view record and the indirect-view record in the visual recognition order. In one example, the number of the warning targets for which both the direct view case and the indirect view case are included may be more than one. For example, the ECU 15 may include both the direct view case and the indirect view case, for example, for a warning target that causes the sight line to move by 90 degrees or more, for example, from the current sight-line direction of the driver 2, to directly view the warning target. In such a case also, the ECU 15 may select, as the warning order, the visual recognition order candidate that is the smallest in the absolute value of the total sight-line movement amount among the visual recognition order candidates. The ECU 15 may select and determine, as the warning order, the visual recognition order candidate achieving the smallest absolute value of the total sight-line movement amount among the total sight-line movement amounts including the direct view cases and the total sight-line movement amounts including both the direct view cases and the indirect view cases.

The number of the warning targets to be visually recognized in any of the mirrors and monitors of the vehicle 1 is not limited to one. For example, the ECU 15 may cause multiple warning targets to be displayed on one monitor by switching the displayed content from one to another of the warning targets.

Including the warning target to be visually recognized by an indirect view may help to reduce the load on the driver 2, as compared with a case where the driver 2 visually recognize all of the warning targets that are the risks outside the vehicle 1 by a direct view. A reduction may be expectable in the total amount of the movement of the sight line for the visual recognition by the driver 2.

Figure 8:
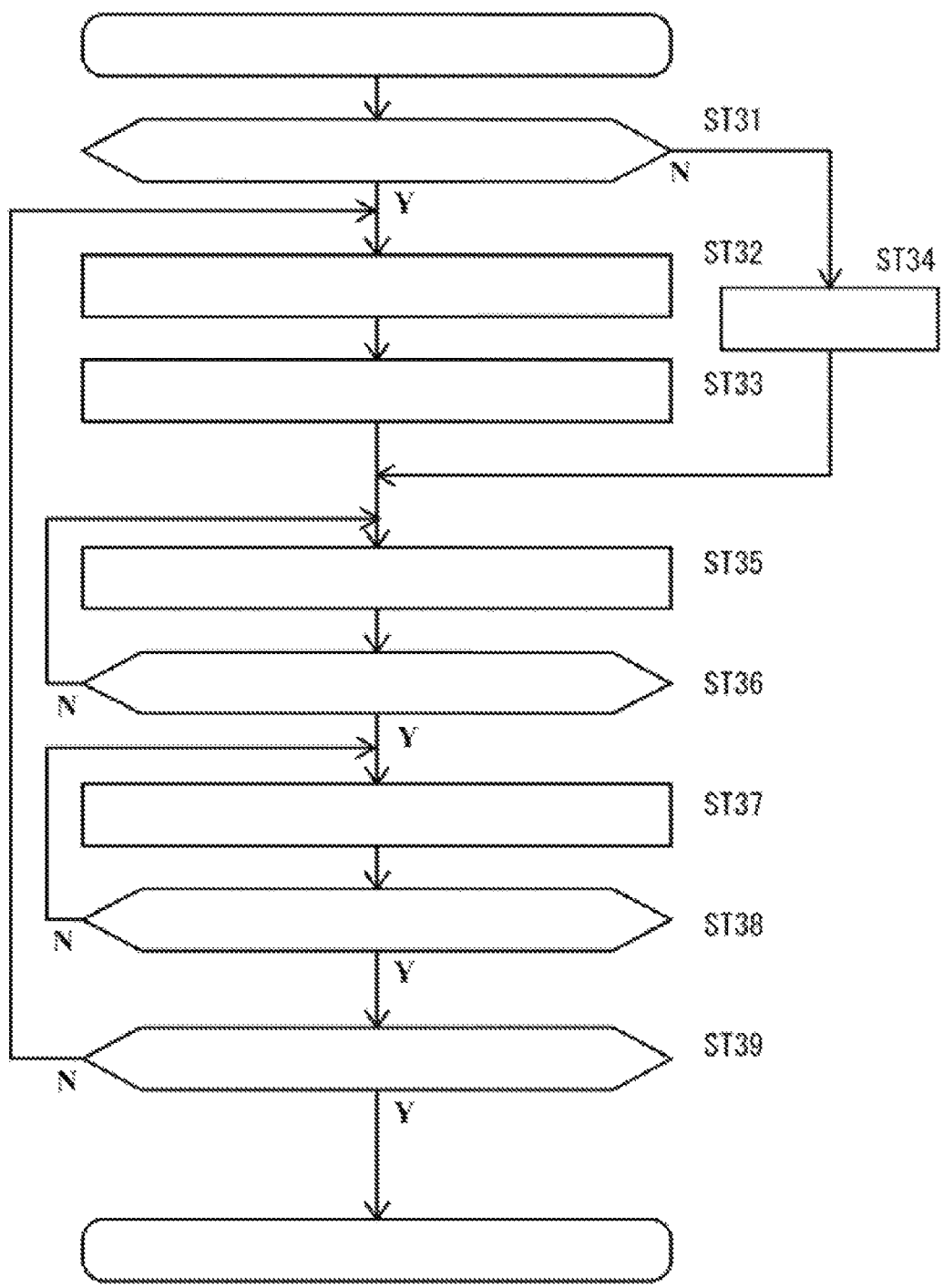
FIG. 8 is a detailed flowchart of a warning output control described in FIG. 3.

FIG. 8 is a detailed flowchart of an example of a warning output control described in FIG. 3.

For example, in step ST11 in FIG. 3, the ECU 15 may execute the warning output control described in FIG. 8 for each of the priority level groups.

In the first step ST31 of the warning output control, the ECU 15 may determine whether the warning order has been generated in relation to the currently selected group. For example, the ECU 15 may determine whether the warning order has been generated, based on whether information related to the warning order related to the currently selected group is obtainable from the memory 14. If the warning order has already been generated (step ST31: Y), the ECU 15 may proceed the process to step ST32. If the warning order has not been generated yet (step ST31: N), in other words, if the currently selected group includes one warning target that is the risk, the ECU 15 may proceed the process to step ST34.

In step ST32, the ECU 15 may acquire information related to the risk not subjected to processing yet in the already-generated warning order. In a first process after starting the warning output control described in FIG. 8 for each of the priority level groups, the ECU 15 may acquire information related to the first risk in the already-generated warning order.

In step ST33, based on the information related to the risk acquired in step ST32, the ECU 15 may cause a warning about the risk to be outputted. For example, the ECU 15 may cause a guidance about the visual recognition direction of the warning target that is the risk to be outputted by means of a voice or a display as the warning. The ECU 15 may cause the warning to be outputted from any of the output units including, without limitation, the speaker 27, the digital outer mirror 24, the rear-view monitor 25, and the meter monitor 26. In accordance with the outputted warning, the driver 2 may view into the guided direction and be thereby able to visually recognize the warning target. Thereafter, the ECU 15 may proceed the process to step ST35.

In step ST34, the ECU 15 may acquire the information related to the single risk belonging to the currently selected group, and may cause a warning about the risk to be outputted. The contents of the process in step ST34 may be similar to those of the processes in steps ST32 and ST33. In accordance with the outputted warning, the driver 2 may view into the guided direction and be thereby able to visually recognize the warning target. Thereafter, the ECU 15 may proceed the process to step ST35.

In step ST35 after the warning has been outputted, the ECU 15 may check a visual recognition state of the driver 2. First, the ECU 15 may acquire the latest captured image of the driver 2, and may acquire the latest sight-line direction based on the part such as the face or the eye of the driver 2.

In step ST36, the ECU 15 may determine whether the acquired latest sight-line direction of the driver 2 matches, for example, the sight-line direction stored in the memory 14 in relation to each warning target. If the latest sight-line direction of the driver 2 does not match the stored sight-line direction (step ST36: N), the ECU 15 may return the process to step S35. The ECU 15 may repeat the processes in steps ST35 and ST36 until the latest sight-line direction of the driver 2 is determined as matching the stored sight-line direction. If the latest sight-line direction of the driver 2 matches the stored sight-line direction (step ST36: Y), the ECU 15 may proceed the process to step ST37.

In step ST37, the ECU 15 may acquire information indicating the mental and physical conditions of the driver 2 before and after the driver 2 visually recognizes the warning target. In this example, the ECU 15 may acquire the heart rate of the driver 2 as the information indicating the mental and physical conditions of the driver 2. Other than the heart rate, the information indicating the mental and physical conditions of the driver 2 may be a pupil size, an amount of blood flow in a face, or any other information. It is assumable that a value of such information indicating the mental and physical conditions tends to change rapidly and greatly when the driver 2 turns his or her attention to a high-risk warning target.

In step ST38, the ECU 15 may determine whether the driver 2 sufficiently recognizes the risk corresponding to the warning target, based on the information indicating the mental and physical conditions of the driver 2, such as the heart rate, acquired in step ST37. The warning targets may include high-risk warning targets to which the driver 2 is to surely turn attention as described above and low-risk warning targets to which the driver 2 is not necessarily to turn attention. In one example, the ECU 15 may determine whether the driver 2 sufficiently recognizes the risk corresponding to the warning target by comparing an amount of change in the value of the information indicating the mental and physical conditions of the driver 2 before and after the driver 2 visually recognizes the warning target with a threshold based on a risk level of the warning target. For example, the ECU 15 may determine whether the driver 2 sufficiently recognizes the risk corresponding to the warning target by comparing the above-described amount of change with a great threshold for the warning target that is a high risk. In contrast, the ECU 15 may determine whether the driver 2 sufficiently recognizes the risk corresponding to the warning target by comparing the above-described amount of change with a small threshold for the warning target that is a low risk.

If the driver 2 does not sufficiently recognize the risk corresponding to the warning target (step ST38: N), the ECU 15 may return the process to step ST37. The ECU 15 may repeat the processes in steps ST37 and ST38 until the ECU 15 determines that the driver 2 sufficiently recognizes the risk corresponding to the warning target. If the driver 2 is determined as sufficiently recognizing the risk corresponding to the warning target (step ST38: Y), the ECU 15 may proceed the process to step ST39. It is assumable that, by this timing, the driver 2 has turned his or her sight line to the warning target about which a warning has been outputted and the driver 2 has sufficiently recognized the risk corresponding to the warning target.

In step ST39, the ECU 15 may determine whether any risk remains not subjected to processing and not subjected to warning output in the current warning output control described in FIG. 8.

If the warning order has not been generated for the currently selected group, the currently selected group may include a single warning target that is a risk. In this case, the ECU 15 may determine that no risk remains not subjected to processing and not subjected to warning output in the current warning output control described in FIG. 8 (step ST39: Y). Thereafter, the ECU 15 may end the warning output control in FIG. 8 and may return the process to the warning output control in FIG. 3.

If the warning order has been generated for the currently selected group, the currently selected group may include multiple warning targets that are risks. In this case, at least in the determination made in step ST39 for the first time, the ECU 15 may determine that a risk remains not subjected to processing and not subjected to warning output (step ST39: N), and may return the process to step ST32. The ECU 15 may repeat the process from step ST32 to step ST39 until the ECU 15 determines that no risk remains not subjected to processing. Thus, the ECU 15 may be able to cause warnings to be outputted that allow the driver 2 to visually recognize the warning targets, which are the risks included in the currently selected group, in order in accordance with the warning order. In addition, the ECU 15 may be able to confirm, based on the detected information obtained by the vehicle inside detection device, that the driver 2 visually recognizes the warning target related to each of the outputted warnings and properly recognizes the risk of the warning target. The ECU 15 may be able to output the warning for the next warning target in order with such confirmation.

In contrast, for example, if warnings about multiple risks outside the vehicle 1 are outputted at the same time, the driver 2 may be to determine, by himself or herself, the order of visual recognition related to the warnings outputted at the same time, and may be to visually recognize the warning targets that are the risks outside the vehicle 1 in order. The first example embodiment may help to reduce such a load on the driver 2. In addition, the first example embodiment may help to more reliably allow the driver 2 to visually recognize the risks outside the vehicle 1. The first example embodiment may help to prevent an occurrence of an issue such as insufficient visual recognition caused by outputting the warnings at the same time.

When the respective visual recognition states of the driver 2 related to the warning targets that are the risks outside the vehicle 1 are determined in order and the warnings about the risks outside the vehicle 1 are outputted in order, it can take time to complete such a control. However, in the above-described control according to the first example embodiment, the driver 2 may be able to turn his or her sight line, for example, to the front of the vehicle 1 while the driver 2 visually recognizes a warning target. Therefore, the driver 2 may not have to visually recognize the warning targets that are the risks outside the vehicle 1 all together in a short time. The driver 2 driving the vehicle 1 may be able to visually recognize the warning targets that are the risks outside the vehicle 1, basically, while checking a situation which the driver 2 himself or herself is put in.

However, if it takes time to output the series of warnings about the risks outside the vehicle 1, the traveling environment of the vehicle 1 can change from a state at a time point when the output of the warnings is started. In this case, in the process in step ST39, the ECU 15 may acquire a period elapsed from the start of the output of the warnings, i.e., an elapsed period, from the timer 13. If the elapsed period exceeds a predetermined value, the ECU 15 may forcefully end the output of the warnings described in FIG. 8. In such a case, some warning targets may remain not subjected to the warning output. However, if the risk corresponding to such a warning target continues to exist, a warning about that warning target may be outputted in the control for the next time. Moreover, if the risk level of the warning target increases and the priority level of the warning target increases accordingly, the possibility that the warning about that warning target is outputted in the control for the next time may increase.

Figure 9:
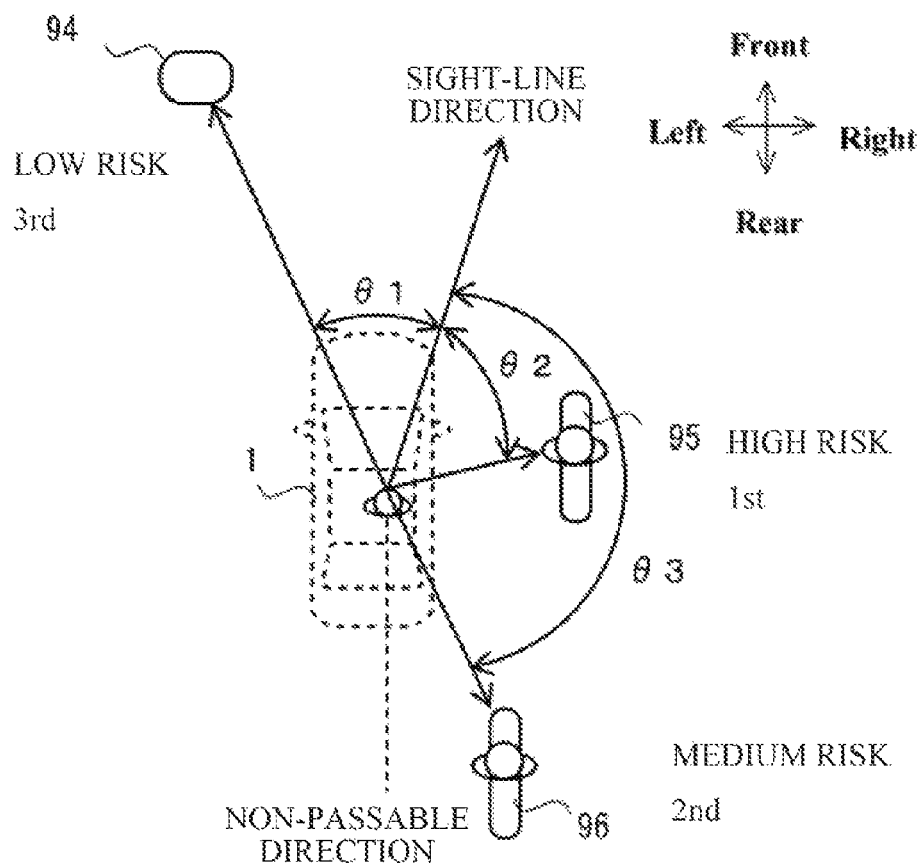
FIG. 9 is an explanatory diagram illustrating an example of a warning order related to the warning targets that are the risks outside the vehicle.
Figure 10:
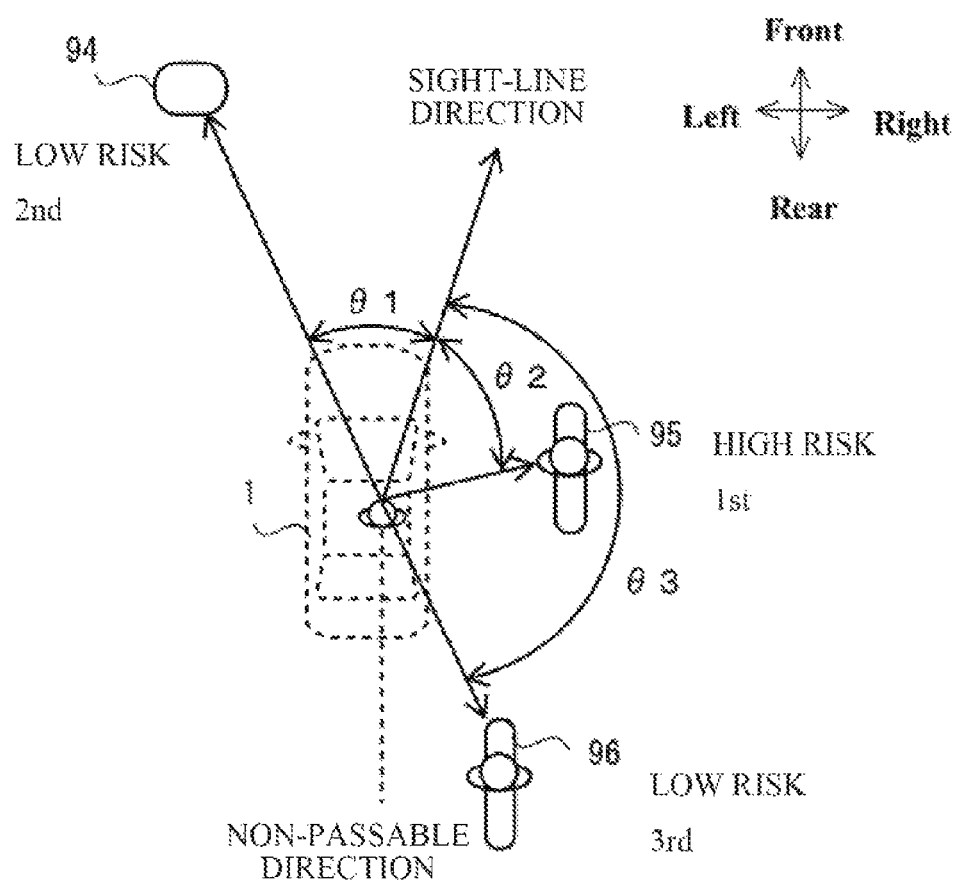
FIG. 10 is an explanatory diagram illustrating another example of the warning order related to the warning targets that are the risks outside the vehicle.
Figure 11:
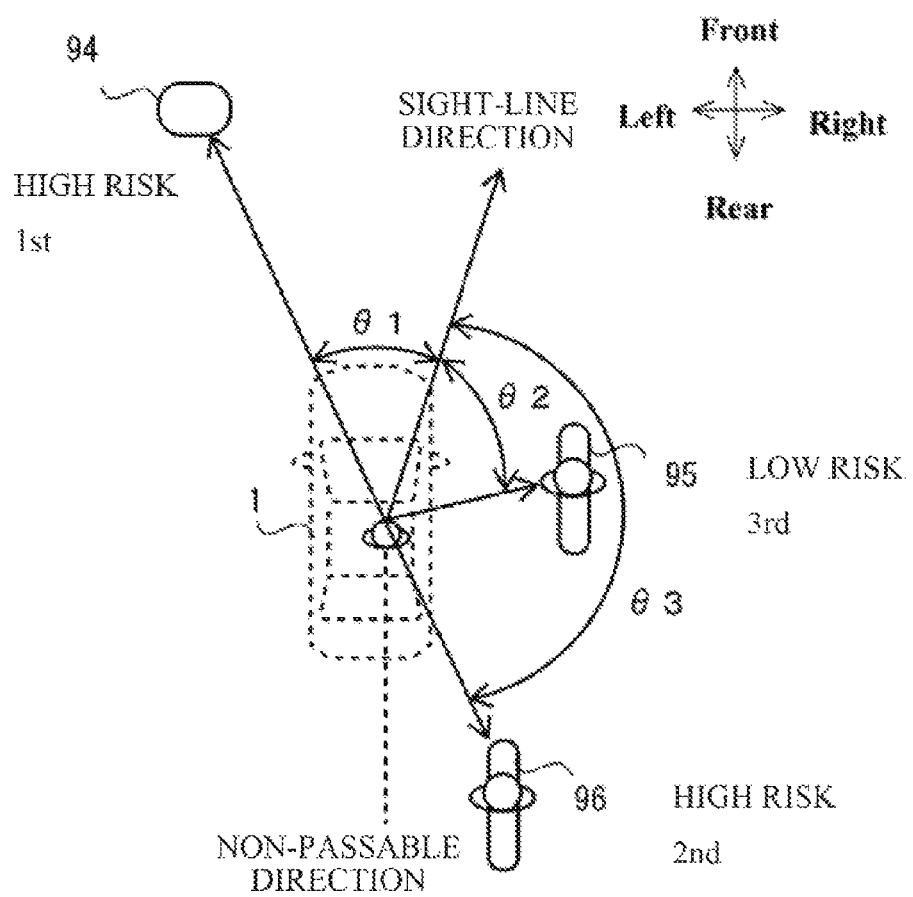
FIG. 11 is an explanatory diagram illustrating still another example of the warning order related to the warning targets that are the risks outside the vehicle.

Next, a description is given of examples of the warning order related to the warning targets that are the risks outside the vehicle 1, with reference to FIGS. 9 to 11.

Each of FIGS. 9 to 11 illustrates the vehicle 1 that outputs a warning for the driver 2, and objects around the vehicle 1. The objects around the vehicle 1 may include the on-road object 94, the first motorcycle 95, and the second motorcycle 96.

The current sight-line direction of the driver 2 may not be in a direction of any of the warning targets described above.

In FIG. 9, the first motorcycle 95 may have a high priority level, the second motorcycle 96 may have a medium priority level, and the on-road object 94 may have a low priority level.

In this case, first, the ECU 15 may select, as a processing target, the first motorcycle 95 which is one of the warning targets that are the risks in the high priority level group, and may guide the sight line of the driver 2 to the first motorcycle 95. On this occasion, the ECU 15 may guide the sight line of the driver 2 by the sight-line movement amount by which the sight line is caused to move to directly view the first motorcycle 95 or by the sight-line movement amount by which the sight line is caused to move to indirectly view the first motorcycle 95 in the digital outer mirror 24.

Thereafter, the ECU 15 may select, as the processing target, the second motorcycle 96 which is one of the warning targets that are the risks in the medium priority level group, and may guide the sight line of the driver 2 to the second motorcycle 96. On this occasion, the ECU 15 may guide the sight line of the driver 2 by the sight-line movement amount by which the sight line is caused to move to directly view the second motorcycle 96 or by the sight-line movement amount by which the sight line is caused to move to indirectly view the second motorcycle 96 in the digital outer mirror 24.

Thereafter, the ECU 15 may select, as the processing target, the on-road object 94 which is one of the warning targets that are the risks in the low priority level group, and may guide the sight line of the driver 2 to the on-road object 94. On this occasion, the ECU 15 may guide the sight line of the driver 2 by the sight-line movement amount by which the sight line is caused to move to directly view the on-road object 94 or by the sight-line movement amount by which the sight line is caused to move to indirectly view the on-road object 94 in the rear-view monitor 25 or the meter monitor 26.

In FIG. 10, the first motorcycle 95 may have a high priority level, and the second motorcycle 96 and the on-road object 94 may each have a low priority level.

In this case, first, the ECU 15 may select, as the processing target, the first motorcycle 95 which is one of the warning targets that are the risks in the high priority level group, and may guide the sight line of the driver 2 to the first motorcycle 95. On this occasion, the ECU 15 may guide the sight line of the driver 2 by the sight-line movement amount by which the sight line is caused to move to directly view the first motorcycle 95 or by the sight-line movement amount by which the sight line is caused to move to indirectly view the first motorcycle 95 in the digital outer mirror 24.

The medium priority group may include more than one warning target. Therefore, the ECU may thereafter determine the warning order based on, for example but not limited to, the total sight-line movement amount. In this example, the ECU 15 may determine the warning order in which the on-road object 94 comes before the second motorcycle 96. In this case, first, the ECU may select, as the processing target, the on-road object 94 which is one of the warning targets that are the risks, and may guide the sight line of the driver 2 to the on-road object 94. On this occasion, the ECU 15 may guide the sight line of the driver 2 by one, which has been used to determine the warning order, of the direct-view sight-line movement amount and the indirect-view sight-line movement amount.

Thereafter, the ECU 15 may select, as the processing target, the second motorcycle 96 which is one of the warning targets that are the risks, remaining not subjected to processing in the medium priority level group, and may guide the sight line of the driver 2 to the second motorcycle 96. On this occasion, the ECU 15 may guide the sight line of the driver 2 by one, which has been used to determine the warning order, of the direct-view sight-line movement amount and the indirect-view sight-line movement amount.

In FIG. 11, the second motorcycle 96 and the on-road object 94 may each have a high priority level, and the first motorcycle 95 may have a low priority level.

In this case, the high priority group may include more than one warning target. Therefore, the ECU 15 may determine the warning order based on, for example but not limited to, the total sight-line movement amount. In this example, the ECU 15 may determine the warning order in which the on-road object 94 comes before the second motorcycle 96. In this case, first, the ECU may select, as the processing target, the on-road object 94 which is one of the warning targets that are the risks, and may guide the sight line of the driver 2 to the on-road object 94. On this occasion, the ECU 15 may guide the sight line of the driver 2 by one, which has been used to determine the warning order, of the direct-view sight-line movement amount and the indirect-view sight-line movement amount.

Thereafter, the ECU 15 may select, as the processing target, the second motorcycle 96 which is one of the warning targets that are the risks, remaining not subjected to processing in the high priority level group, and may guide the sight line of the driver 2 to the second motorcycle 96. On this occasion, the ECU 15 may guide the sight line of the driver 2 by one, which has been used to determine the warning order, of the direct-view sight-line movement amount and the indirect-view sight-line movement amount.

Thereafter, because the medium priority level group does not include any warning target, the ECU 15 may execute processing for the low priority level group. The ECU 15 may select, as the processing target, the first motorcycle 95 which is one of the warning targets that are the risks in the low priority level group, and may guide the sight line of the driver 2 to the first motorcycle 95. On this occasion, the ECU 15 may guide the sight line of the driver 2 by the sight-line movement amount by which the sight line is caused to move to directly view the first motorcycle 95 or may guide the sight line of the driver 2 by the sight-line movement amount by which the sight line is caused to move to indirectly view the first motorcycle 95 in the digital outer mirror 24.

Note that, in FIGS. 9 to 11, the on-road object 94, the first motorcycle 95, and the second motorcycle 96 which are the warning targets that are the risks present around the vehicle 1 may have different priority levels. The ECU 15 may set a priority level to each of the warning targets that are the respective risks in the process in step ST3 in FIG. 3. On this occasion, the ECU 15 may determine a type or an attribute of the warning target that is each of risks, classify the warning target that the risk, and determine the priority level based on, for example, the classification.

For example, as illustrated in FIG. 1, the on-road object 94 may be present on a road surface on which the vehicle 1 travels. The on-road object 94 may provide irregularity on the road surface. When the vehicle 1 runs on the on-road object 94, the vehicle body of the vehicle 1 can incline. When the vehicle 1 does not run on the on-road object 94, the on-road object 94 may not influence the traveling of the vehicle 1. For such a reason, if the warning target that is the risk does not move relative to the road surface, the ECU 15 may determine such a warning target that is the risk as the on-road object 94, for example. When the on-road object 94 is present within an estimated traveling path 81 of the vehicle 1, the ECU 15 may set a high priority level to the on-road object 94. When the on-road object 94 is present near the estimated traveling path 81, the ECU 15 may set a medium priority level to the on-road object 94. When the on-road object 94 is present away from the estimated traveling path 81, the ECU 15 may set a low priority level to the on-road object 94.

For example, as illustrated in FIG. 1, the estimated traveling path 81 may be set in front of the vehicle 1 in a traveling direction of the vehicle 1. A width of the estimated traveling path 81 may be based on a width of the vehicle 1 but may have a certain margin. A length of the estimated traveling path 81 may be based on a distance by which the vehicle 1 travels in a repetitive cycle of the control described in FIG. 3 but may have a certain margin.

The first automobile 91, the second automobile 92, the first motorcycle 95, the second motorcycle 96, the fourth motorcycle 97, the third motorcycle 98, and the pedestrian 93 may move, unlike the on-road object 94. A movement characteristic may differ depending on an attribute of the mobile body. As compared with an automobile, the first motorcycle 95, the second motorcycle 96, the fourth motorcycle 97, and the third motorcycle 98 may tend to move forward, passing through a narrow space by the vehicle 1. The pedestrian 93 may tend to be slower in speed than an automobile, but may suddenly change its moving direction or may suddenly come out onto the road. For such a reason, in one example, if the warning target that is the risk is a mobile body that moves relative to the road surface, the ECU 15 may classify the warning target that is the risk into any of the first automobile 91, the second automobile 92, the first motorcycle 95, the second motorcycle 96, the fourth motorcycle 97, the third motorcycle 98, and the pedestrian 93, based on a characteristic of its movement. In addition, when the mobile body is present within the estimated traveling path 81 of the vehicle 1 or when the mobile body is moving toward the estimated traveling path 81, the ECU 15 may set a high priority level to the mobile body. When the mobile body moves near the estimated traveling path 81, the ECU 15 may set a medium priority level to the mobile body. When the mobile body remains away from the estimated traveling path 81, the ECU 15 may set a low priority level to the mobile body.

Determining the type or the attribute of the warning target that is the risk and classifying the warning target in the above-described manner may make it possible to suppress an increase in the number of the risks about which warnings are to be outputted, and may make it possible to output a warning about the warning target about which a warning is to be outputted with priority over other warning targets in accordance with the priority levels.

As described above, in the first example embodiment, when multiple risks outside the vehicle 1 are detected for each group having the same priority level, the ECU 15 may acquire the sight-line direction of the driver 2 from the detected information acquired from the detection device, and may calculate the sight-line movement amounts based on the acquired sight-line direction as a reference. Further, the ECU 15 may determine the warning order, i.e., the order in which the output unit is caused to output the warnings, related to the risks outside the vehicle 1 at least based on the sight-line movement amounts related to the risks. Here, in one example, the ECU 15 may determine the warning order and thereby minimize the sight-line movement amount by which the sight line is caused to move to visually recognize the risks outside the vehicle 1 in order. Further, the output unit may output the warnings that allow the sight line to be guided to the risks outside the vehicle 1 in accordance with the order determined by the ECU 15.

This helps to allow the driver 2 of the vehicle 1 to visually recognize the risks outside the vehicle 1 in order by a small amount of movement of the sight line.

For example, in the first example embodiment, the warnings about the risks outside the vehicle 1 may be outputted in the order that allows for a reduction in movement of the sight line. This helps to reduce the load on the driver 2 at the time when the driver 2 tries to visually recognize the risks outside the vehicle 1. In contrast, for example, if the warnings about the risks outside the vehicle 1 are outputted together at the same time, the driver 2 can be surprised by the output of the warnings about the risks outside the vehicle 1 at the same time, and can hastily check the risks outside the vehicle 1 about which the warning has been outputted at the same time. The driver 2 can thus be easily confused. In addition, for example, if the warnings about the risks outside the vehicle 1 are outputted at random, it can take more time for the driver 2 to finish checking all of the risks outside the vehicle 1, as compared with a case where the warnings are outputted in the order that allows for a smaller sight-line movement amount. The first example embodiment of the disclosure helps to prevent the above-described situations from occurring easily.

In the first example embodiment of the disclosure, when multiple risks outside the vehicle 1 are present, the warning order may be so determined as to minimize the sight-line movement amount related to those risks, as described above. It is therefore possible to output the warnings in such a manner that the load on the driver 2 is reduced.

Further, in the first example embodiment, the ECU 15 may calculate the direct-view sight-line movement amount and the indirect-view sight-line movement amount. The direct-view sight-line movement amount may be the sight-line movement amount by which the sight line is caused to move to directly view the risk. The indirect-view sight-line movement amount may be the sight-line movement amount by which the sight line is caused to move to visually recognize the risk in the mirror of the vehicle 1 or in the monitor of the vehicle 1. Further, upon determining the warning order, the ECU 15 may select one of the direct-view sight-line movement amount and the indirect-view sight-line movement amount that allows the sight-line movement amount, by which the sight line is caused to move to visually recognize the risks outside the vehicle 1 in order, to be minimized. This allows the driver 2 to, when visually recognizing the risks outside the vehicle 1 in order in accordance with the warnings, not only directly view the risks but also indirectly visually recognize any of the risks in the mirror or the in-vehicle monitor of the vehicle 1. As a result, it is expectable that the amount of the movement of the sight line of the driver 2 is further reduced.

Second Example Embodiment

Next, a description is given of a vehicle outside risk visual recognition guiding apparatus according to a second example embodiment of the disclosure.

Figure 12:
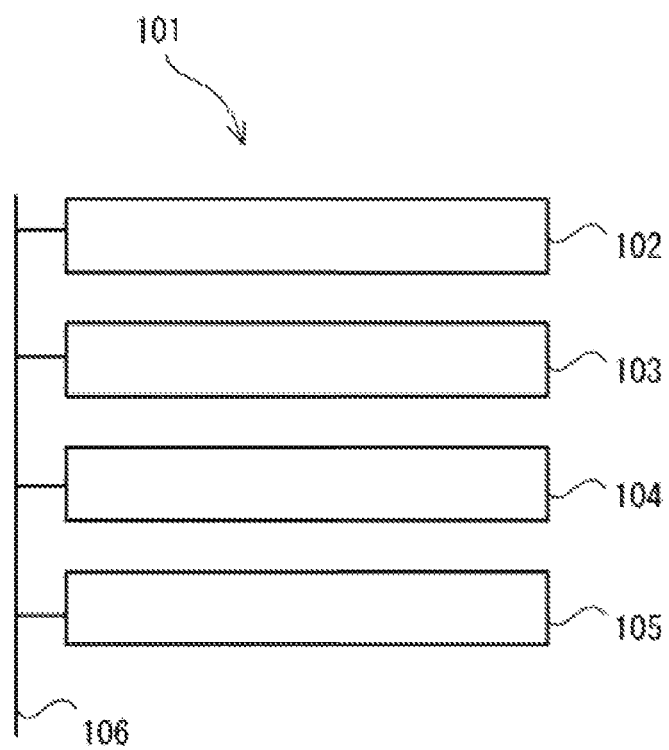
FIG. 12 is an explanatory diagram illustrating a server apparatus to which a vehicle outside risk visual recognition guiding apparatus according to one example embodiment of the technology is to be applied.

FIG. 12 is an explanatory diagram illustrating a server apparatus 101 to which the vehicle outside risk visual recognition guiding apparatus according to the second example embodiment of the disclosure is to be applied.

The server apparatus 101 illustrated in FIG. 12 may include a server communication device 102, a server timer 103, a server memory 104, a server CPU 105, and a server bus 106 to which the server communication device 102, the server timer 103, the server memory 104, and the server CPU 105 are coupled.

The server communication device 102 may communicate with an outside of the server apparatus 101. As illustrated in FIG. 2, the server communication device 102 may transmit information to the vehicle outside communication device 28 of the vehicle 1 and receive information from the vehicle outside communication device 28 via the base station 100.

The server timer 103 may measure a time and a time period.

The server memory 104 may store, for example, a program to be executed by the server CPU 105 and information as data.

The server CPU 105 may read and execute the program stored in the server memory 104. The server CPU 105 may thus control an operation of the server apparatus 101 illustrated in FIG. 12. The server CPU 105 may control respective operations of the server timer 103, the server memory 104, and the server communication device 102 coupled to the server bus 106, and thereby execute a vehicle outside risk visual recognition guiding control in the server apparatus 101.

In the second example embodiment, the server CPU 105 may execute the vehicle outside risk visual recognition guiding control similar to the control illustrated in FIG. 3.

In this case, the ECU 15 of the control system 10 of the vehicle 1 may control transmission and reception, between the vehicle outside communication device 28 and the server apparatus 101, of information which the server apparatus 101 is to use to execute the vehicle outside risk visual recognition guiding control. For example, the ECU 15 of the control system 10 of the vehicle 1 may transmit the above-described various pieces of information detected in the vehicle 1 to the server apparatus 101.

In addition, in one example, the ECU 15 of the control system 10 of the vehicle 1 may cause the speaker 27 of the vehicle 1 to output a synthesized voice guiding a visual recognition direction of a warning target that is a risk based on information related to warning output received from the server apparatus 101.

As described above, the server apparatus 101 in the second example embodiment may be able to communicate with the vehicle 1 and thereby execute the risk recognition guiding control of guiding the sight line of the driver 2 of the vehicle 1 to the warning target.

In the second example embodiment, the server apparatus 101 is described as being separate from the base station 100. However, in one example, the server apparatus 101 may be integrated with the base station 100. Some base stations 100 for next-generation communications, such as may be configured to perform advanced calculation processing. In such a case, the server apparatus 101 may be dispersed into multiple base stations 100. In such a case, the server apparatus 101 corresponding to each of the base stations 100 may execute a control of guiding the sight line of each of the drivers 2 for respective vehicles 1 present in a zone of the corresponding base station 100. In addition, in one example, the server CPU 105 of the server apparatus 101 may select a warning target detected by a vehicle other than the vehicle 1 as the warning target that is a risk of each of the vehicles 1. In addition, in one example, the server CPU 105 may perform mapping of the mobile bodies including the vehicles 1 and the pedestrian 93 on map data, and may select the warning target that is the risk of each of the vehicles 1 based on the mapping.

Although some example embodiments of the disclosure have been described in the foregoing by way of example with reference to the accompanying drawings, the disclosure is by no means limited to the embodiments described above. It should be appreciated that modifications and alterations may be made by persons skilled in the art without departing from the scope as defined by the appended claims. The disclosure is intended to include such modifications and alterations in so far as they fall within the scope of the appended claims or the equivalents thereof.

In the above-described example embodiments, the control system 10 of the vehicle 1 or the server apparatus 101 configured to communicate with the vehicle 1 may execute the vehicle outside risk visual recognition guiding control.

Other than the above, in one example, the control system 10 of the vehicle 1 and the server apparatus 101 configured to communicate with the vehicle 1 may cooperate and thereby execute the vehicle outside risk visual recognition guiding control.

In the above-described example embodiments, the ECU 15 may set priority levels to respective warning targets that are risks and determine the warning order related to the risks for each priority level group.

Alternatively, in one example, the ECU 15 may determine the warning order related to all of the risks without setting the priority levels to the respective warning targets that are the risks.

In the above-described example embodiments, when the warnings about the warning targets that are the risks are outputted, the ECU 15 may output the warning about the next risk after checking the recognition of the driver 2 based on the sight line of the driver 2 and a change in the mental and physical conditions of the driver 2 such as the heart rate of the driver 2.

Alternatively, in one example, the ECU 15 may output the warning about the next risk after checking one of the visual recognition of the driver 2 and the change in the mental and physical conditions of the driver 2.

In another example, the ECU 15 may output the warning about the next risk after the elapse of a predetermined time period is measured by the timer 13, without checking anything about the driver 2.

According to one embodiment of the disclosure, a processor acquires a sight-line direction of a driver from detected information acquired from a vehicle inside detection device. The processor calculates sight-line movement amounts based on the acquired sight-line direction of the driver as a reference. The sight-line movement amounts are each an amount by which the sight line is caused to move to visually recognize any one of warning targets that are risks outside a vehicle. The processor determines a warning order related to the risks outside the vehicle at least based on the sight-line movement amounts by which the sight line is caused to move from the sight-line direction of the driver to visually recognize the warning targets that are the risks. The warning order is an order in which an output unit is to output warnings about the risks outside the vehicle. The processor causes the output unit to output the warnings that allow the warning targets that are the risks outside the vehicle to be visually recognized in accordance with the determined warning order.

According to the embodiment of the disclosure, it is thus possible to output, when multiple risks are present outside the vehicle, the warnings about the risks. In addition, according to the embodiment of the disclosure, it is possible to output the warnings about the risks outside the vehicle to suppress a load on the driver.

The ECU 15 illustrated in FIG. 2 is implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of the ECU 15 illustrated in FIG. 2. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the nonvolatile memory may include a ROM and a NVRAM. The ASIC is an integrated circuit (IC) customized to perform, and the FPGA is an integrated circuit designed to be configured after manufacturing in order to perform, all or a part of the functions of the ECU 15 illustrated in FIG. 2.

The invention claimed is:

1. A vehicle outside risk visual recognition guiding apparatus comprising:
   an output unit configured to output a warning that allows a sight line of a driver of a vehicle to be guided to a risk outside the vehicle;
   a vehicle inside detection device configured to detect information from which a sight-line direction of the driver of the vehicle is acquirable, the sight-line direction of the driver being a direction of the sight line of the driver; and
   a processor configured to acquire detected information that is the information detected by the vehicle inside detection device, wherein
   the processor is configured to
      acquire the sight-line direction of the driver from the detected information acquired from the vehicle inside detection device,
      calculate sight-line movement amounts based on the acquired sight-line direction of the driver as a reference, the sight-line movement amounts each being an amount by which the sight line is caused to move to visually recognize any one of warning targets that are risks outside the vehicle,
      determine a warning order related to the risks outside the vehicle at least based on the sight-line movement amounts by which the sight line is caused to move from the acquired sight-line direction of the driver to visually recognize the warning targets that are the risks, the warning order being an order in which the output unit is to output warnings about the risks outside the vehicle, and
      cause the output unit to output the warnings that allow the warning targets that are the risks outside the vehicle to be visually recognized in accordance with the determined warning order.

2. The vehicle outside risk visual recognition guiding apparatus according to claim 1, wherein the processor is configured to determine the warning order and thereby minimize a total sight-line movement amount by which the sight line is caused to move to visually recognize the warning targets that are the risks in order.

3. The vehicle outside risk visual recognition guiding apparatus according to claim 2, wherein the processor is configured to
   calculate a direct-view sight-line movement amount and an indirect-view sight-line movement amount, the direct-view sight-line movement amount being the sight-line movement amount by which the sight line is caused to move to directly view the warning target that is the risk, the indirect-view sight-line movement amount being the sight-line movement amount by which the sight line is caused to move to visually recognize the warning target that is the risk in a mirror of the vehicle or in a monitor of the vehicle, and
   upon determining the warning order, select one, of the direct-view sight-line movement amount and the indirect-view sight-line movement amount, that allows the total sight-line movement amount to be minimized.

4. The vehicle outside risk visual recognition guiding apparatus according to claim 3, wherein the processor is configured to calculate, as the indirect-view sight-line movement amount, the sight-line movement amount by which the sight line is caused to move to visually recognize the warning target that is the risk in one or more of a digital outer mirror, a reflective side mirror, a rear-view monitor, a reflective room mirror, and a meter monitor that are provided to the vehicle.

5. The vehicle outside risk visual recognition guiding apparatus according to claim 4, wherein the processor is configured to calculate the sight-line movement amounts and thereby determine the warning order when number of the warning targets that are the risks outside the vehicle excluding the risk present in the sight-line direction of the driver acquired from the detected information acquired from the vehicle inside detection device is two or more.

6. The vehicle outside risk visual recognition guiding apparatus according to claim 5, wherein the processor is configured to calculate, as the sight-line movement amount related to the warning target that is the risk, the sight-line movement amount by which the sight line is caused to move in a direction not passing a rear direction of the vehicle.

7. The vehicle outside risk visual recognition guiding apparatus according to claim 1, wherein the processor is configured to
   set a priority level to each of the risks,
   put the risks in groups based on the priority levels, and
   when any of the groups includes multiple warning targets that are the risks outside the vehicle, determine the warning order in the group including the multiple warning targets that are the risks based on the sight-line movement amounts.

8. The vehicle outside risk visual recognition guiding apparatus according to claim 2, wherein the processor is configured to
set a priority level to each of the risks,
put the risks in groups based on the priority levels, and
when any of the groups includes multiple warning targets that are the risks outside the vehicle, determine the warning order in the group including the multiple warning targets that are the risks based on the sight-line movement amounts.

9. The vehicle outside risk visual recognition guiding apparatus according to claim 3, wherein the processor is configured to
set a priority level to each of the risks,
put the risks in groups based on the priority levels, and
when any of the groups includes multiple warning targets that are the risks outside the vehicle, determine the warning order in the group including the multiple warning targets that are the risks based on the sight-line movement amounts.

10. The vehicle outside risk visual recognition guiding apparatus according to claim 4, wherein the processor is configured to
set a priority level to each of the risks,
put the risks in groups based on the priority levels, and
when any of the groups includes multiple warning targets that are the risks outside the vehicle, determine the warning order in the group including the multiple warning targets that are the risks based on the sight-line movement amounts.

11. The vehicle outside risk visual recognition guiding apparatus according to claim 5, wherein the processor is configured to
set a priority level to each of the risks,
put the risks in groups based on the priority levels, and
when any of the groups includes multiple warning targets that are the risks outside the vehicle, determine the warning order in the group including the multiple warning targets that are the risks based on the sight-line movement amounts.

12. The vehicle outside risk visual recognition guiding apparatus according to claim 6, wherein the processor is configured to
set a priority level to each of the risks,
put the risks in groups based on the priority levels, and
when any of the groups includes multiple warning targets that are the risks outside the vehicle, determine the warning order in the group including the multiple warning targets that are the risks based on the sight-line movement amounts.

13. The vehicle outside risk visual recognition guiding apparatus according to claim 7, wherein the processor is configured to confirm, based on the detected information acquired from the vehicle inside detection device, that the driver of the vehicle visually recognizes the warning target that is the risk outside the vehicle about which the warning has been outputted, and thereafter cause the output unit to output the warning about the warning target that is the next risk outside the vehicle.

14. The vehicle outside risk visual recognition guiding apparatus according to claim 8, wherein the processor is configured to confirm, based on the detected information acquired from the vehicle inside detection device, that the driver of the vehicle visually recognizes the warning target that is the risk outside the vehicle about which the warning has been outputted, and thereafter cause the output unit to output the warning about the warning target that is the next risk outside the vehicle.

15. The vehicle outside risk visual recognition guiding apparatus according to claim 9, wherein the processor is configured to confirm, based on the detected information acquired from the vehicle inside detection device, that the driver of the vehicle visually recognizes the warning target that is the risk outside the vehicle about which the warning has been outputted, and thereafter cause the output unit to output the warning about the warning target that is the next risk outside the vehicle.

16. The vehicle outside risk visual recognition guiding apparatus according to claim 10, wherein the processor is configured to confirm, based on the detected information acquired from the vehicle inside detection device, that the driver of the vehicle visually recognizes the warning target that is the risk outside the vehicle about which the warning has been outputted, and thereafter cause the output unit to output the warning about the warning target that is the next risk outside the vehicle.

17. The vehicle outside risk visual recognition guiding apparatus according to claim 11, wherein the processor is configured to confirm, based on the detected information acquired from the vehicle inside detection device, that the driver of the vehicle visually recognizes the warning target that is the risk outside the vehicle about which the warning has been outputted, and thereafter cause the output unit to output the warning about the warning target that is the next risk outside the vehicle.

18. The vehicle outside risk visual recognition guiding apparatus according to claim 12, wherein the processor is configured to confirm, based on the detected information acquired from the vehicle inside detection device, that the driver of the vehicle visually recognizes the warning target that is the risk outside the vehicle about which the warning has been outputted, and thereafter cause the output unit to output the warning about the warning target that is the next risk outside the vehicle.

* * * * *